US012679716B2

(12) United States Patent
Bihl et al.

(10) Patent No.:  US 12,679,716 B2
(45) Date of Patent:      Jul. 14, 2026

(54) LOGISTICS SYSTEM FOR THE AUTOMATIC TRANSFER OF AT LEAST ONE FLUID MEDIUM

(71) Applicant: BASF SE, Ludwigshafen am Rhein (DE)

(72) Inventors: Ralf Bihl, Ludwigshafen am Rhein (DE); Thorsten Bieker, Ludwigshafen am Rhein (DE); Simon Fernando Magnus Callau Monje, Ludwigshafen am Rhein (DE); Manuel Simgen, Ludwigshafen am Rhein (DE); Holger Schmiers, Gruenstadt (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 19/104,531

(22) PCT Filed: Sep. 6, 2023

(86) PCT No.: PCT/EP2023/074462
§ 371 (c)(1),
(2) Date: Feb. 18, 2025

(87) PCT Pub. No.: WO2024/052410
PCT Pub. Date: Mar. 14, 2024

(65) Prior Publication Data
US 2026/0054977 A1      Feb. 26, 2026

(30) Foreign Application Priority Data
Sep. 7, 2022      (EP) ..................................... 22194401

(51) Int. Cl.
*B67D 7/38*          (2010.01)
*G06Q 10/083*       (2023.01)

(52) U.S. Cl.
CPC ............. *B67D 7/38* (2013.01); *G06Q 10/083* (2013.01)

(58) Field of Classification Search
CPC ... B67D 7/40; B67D 7/00; B67D 7/38; G06Q 10/083
See application file for complete search history.

(56) References Cited

U.S. PATENT DOCUMENTS 6,237,647 B1 *    5/2001    Pong ...................... B67D 7/348
                                                                    141/94
6,279,624 B1 *    8/2001    Corfitsen ............. B67D 7/0401
                                                                    141/98
6,681,815 B1 *    1/2004    Westrich .............. B67D 7/3272
                                                                    141/83

FOREIGN PATENT DOCUMENTS

CN          107298424 A       10/2017
CN          111573608 A        8/2020
(Continued)

OTHER PUBLICATIONS

International Search Report for PCT/EP2023/074462 dated Dec. 6, 2023, 6 pages.
(Continued)

*Primary Examiner* — Jason K Niesz
(74) *Attorney, Agent, or Firm* — Armstrong Teasdale LLP

(57) ABSTRACT

Disclosed herein is a logistics system and a method for the automatic transshipment of at least one fluid medium. The logistics system includes at least one transshipment site, wherein the transshipment site is configured to carry out at least one process selected from the group consisting of loading a mobile tank with the fluid medium and unloading the fluid medium from the mobile tank, where the transshipment site has at least one pipe system having at least one pipe connection, at least one controller, where the controller is programmed to control at least one function of the
(Continued)

logistics system, at least one movement system having at least one movement arm and an automatic coupling system, where the movement arm is configured to move the coupling system, where the automatic coupling system is configured to automatically open at least one tank nozzle of the mobile tank, where the automatic coupling system is furthermore configured to automatically open the pipe connection of the transshipment site, and where the automatic coupling system is furthermore configured to fluidically connect the tank nozzle and the pipe connection.

17 Claims, 16 Drawing Sheets

(56)                    References Cited

FOREIGN PATENT DOCUMENTS

| CN | 114455531 A | 5/2022 |
| JP | H09286498 A | 11/1997 |

OTHER PUBLICATIONS

Written Opinion for PCT/EP2023/074462 dated Dec. 6, 2023, 5 pages.

* cited by examiner

LOGISTICS SYSTEM FOR THE AUTOMATIC TRANSFER OF AT LEAST ONE FLUID MEDIUM

CROSS-REFERENCE TO RELATED APPLICATIONS

This application is a U.S. National Phase Application of International Patent Application No. PCT/EP23/74462, filed Sep. 6, 2023, which claims priority to European Patent Application No. 22194401.0, filed Sep. 7, 2022, each of which are hereby incorporated by reference herein.

TECHNICAL FIELD

The present invention relates to a logistics system for the automatic transshipment of at least one fluid medium and to a method for the transshipment of at least one fluid medium.

TECHNICAL BACKGROUND

In many technical fields, mobile tanks are loaded or unloaded before or after transport or storage. This loading and unloading takes place at what is known as a transshipment site.

This is a facility at which mobile tanks may be loaded or unloaded. The product to be loaded comes either from one or more stationary tanks, other mobile tanks, or from pipelines that may in turn be connected to production. During unloading, the product is transported accordingly to stationary tanks, other mobile tanks or directly to consumers via pipelines.

The loading and unloading process is at present carried out manually by employees. For this purpose, the employees order a mobile tank to the transshipment site. The mobile tank is then connected to the transshipment site. For this purpose, pipes or hoses are connected to the fittings on the mobile tank. In the case of mobile tanks that have all openings and valves above the fluid level, the connection is made to the upper fittings. In the case of mobile tanks that also have openings below the fluid level, the connection may be made at the top or bottom. For this purpose, at least two connections are generally established; one line through which the product is intended to flow and a second line through which the gases are intended to be displaced. For non-hazardous products, gas displacement may optionally not be necessary, but pressure equalization then has to be established by opening an upper fitting. This connection process is carried out in each case at the start of loading or unloading, and accordingly a second time after loading and unloading has been completed. Due to the relatively high weight of the pipes or hoses, some of which are provided with couplings or flanges, the connection processes are optionally supported by mechanical/hydraulic/pneumatic systems such as articulated loading arms. Other activities carried out by loading staff include monitoring during the filling process and documenting the activity in checklists. The employee on site also monitors that overfilling does not take place. To do this, they use either a scales, a flow meter or a fill level meter, which likewise has to be connected manually.

Despite the numerous advantages of the logistics systems with a transshipment site that are known from the prior art, they still have potential for improvement. In the case of a large number of transshipment sites, the staff available for the activities described above thus constitutes the bottleneck. There is also a lack of flexibility. As a result, many transshipment sites are not operated optimally, because for example work is carried out at the transshipment site only during the day or in extended day shifts. Manually operated transshipment sites are also not able to react well to fluctuations.

OBJECT OF THE INVENTION

It would therefore be desirable to provide a logistics system and a method for the transshipment of at least one fluid medium that at least largely avoid the disadvantages of known logistics systems. In particular, the transshipment should take place automatically, such that the transshipment process is able to be completely automated through automation, and as a result the transshipment site is able to be operated flexibly, sometimes with a high and sometimes with a lower number of mobile tanks to be loaded and unloaded. This also, for the first time, enables safeguarding concepts in which for example half of the products are intended to be transported by one mode of transport, such as for example inland waterway vessel, and the other half are intended to be transported by another mode of transport, such as for example rail. In the event of bottlenecks with one mode of transport, such as for example low water in the case of inland waterway transport, it is thus possible to change flexibly to another mode of transport, which is only possible if, as a result of automation, the loading staff are not the bottleneck.

It would also be desirable to automate loading processes in which the loading staff would be severely harmed in the event of unplanned (unintended) release of the fluid medium resulting from the leakage of the fluid medium. The automation would mean that no people would be in the direct danger zone, and a risk to people could thus be ruled out or reduced.

It would also be desirable to automate loading processes since, in the event of an accident or unintentional release of the fluid medium, the method is suitable for closing the tank even during the emergency measures that have already begun and, optionally, for also having it removed from the danger zone by an automatic transport system, thus reducing the risk or the effects of an accident. By contrast, this is not possible in the case of non-automated loading processes performed by people, as the people would be evacuated first in the event of danger. A mobile tank not involved in the accident/incident could thus be closed by the proposed system and transported out of the danger zone by way of the proposed method. The effects of a possible spread of the accident/incident (for example fire) to the hitherto unaffected mobile tank would thus be avoided, and thus the effects of accidents would thus be reduced, by the proposed invention.

GENERAL DESCRIPTION OF THE INVENTION

This object is addressed by a logistics system and a method for the transshipment of at least one fluid medium having the features of the independent patent claims. Advantageous developments, which may be implemented individually or in any combination, are set forth in the dependent claims.

In the following, the terms "have", "comprise" or "include" or any grammatical variations thereof are used in a non-exclusive manner. Accordingly, these terms may relate to situations in which there are no further features apart from the features introduced by these terms or to situations in which there is or are one or more further features. For example, the expression "A has B", "A comprises B" or "A includes B" may relate both to the situation in which, apart from B, there is no further element in A (i.e. to a situation in which A exclusively consists of B) and to the situation in which, in addition to B, there is or are one or more further elements in A, for example element C, elements C and D or even further elements.

It is also pointed out that the terms "at least one" and "one or more" and grammatical variations of these terms, when these are used in connection with one or more elements or features and are intended to express that the element or feature may be provided one or more times, are generally used only once, for example when the feature or element is introduced for the first time. When the feature or element is subsequently mentioned again, the corresponding term "at least one" or "one or more" is generally no longer used, without restricting the possibility that the feature or element may be provided one or more times.

Furthermore, in the following the terms "preferably", "in particular", "for example" or similar terms are used in connection with optional features, without alternative embodiments being restricted thereby. Thus, features that are introduced by these terms are optional features, and there is no intention to restrict the scope of protection of the claims, and in particular of the independent claims, by these features. Thus, as a person skilled in the art will appreciate, the invention may also be carried out using other configurations. In a similar way, features that are introduced by "in an embodiment of the invention" or by "in an example of the invention" are understood as optional features, without it being intended that alternative configurations or the scope of protection of the independent claims are restricted thereby. Furthermore, all the possible combinations of the features thereby introduced with other features, whether optional or non-optional features, shall remain unaffected by these introductory expressions.

In a first aspect of the present invention, what is proposed is a logistics system for the automatic transshipment of at least one fluid medium.

The term "logistics system", as used here, is a broad term that should be attributed its usual and common meaning as understood by a person skilled in the art. The term is not restricted to a specific or adapted meaning. The term may, without restriction, refer in particular to a system that serves to change goods in terms of space, time, type and quantity. Accordingly, a logistics system may comprise a transport, storage and/or picking system in order to carry out this function. The entire flow of goods is supported by the packaging processes that take place in the packaging system, which facilitate or often even simply enable transport, storage and picking. Information, that is to say intangible goods, triggers the entire (material) flow of goods. The flow of information, which is of great importance in organizational design, runs parallel to the logistics chain and corresponds to the flow of material. Any logistics system is characterized by the interaction of movement and storage processes. Objects (goods, energy, information, people) are guided through a network of nodes (stores, warehouses) and edges (movements). Various connecting structures are possible between source (delivery point) and sink (reception point). In single-stage logistics systems, there is a direct flow of goods between delivery point (source) and reception point (sink). In multi-stage logistics systems, there is an indirect flow of goods-interrupted by at least one further node at which additional storage processes and/or movement processes take place. At a sorting point, the goods arrive in large quantities from the delivery point and leave it, in small quantities, to go to various reception points. The sorting consists either in purely reducing the quantities of a specific product or in compiling (sorting, picking) goods by quantity and type (example: A furniture manufacturer maintains regional distribution warehouses for supplying the retail sector). In multi-stage logistics systems, combined traffic often occurs, which is carried out using different means of transport. At a hub point, smaller quantities are received from multiple delivery points and leave said hub point in large quantities to go to a reception point. Finally, combined logistics systems include direct and indirect flows of goods next to one another.

The term "transshipment" and its grammatical equivalents, as used here, is a broad term that should be attributed its usual and common meaning as understood by a person skilled in the art. The term is not restricted to a specific or adapted meaning. The term may, without restriction, refer in particular to a change of the means of transport and/or of the transport route and/or storage means within a supply or transport chain. Transshipment involves the reception of a transported product in a means of transport (loading) and/or unloading from a means of transport (unloading). Transshipment comprises all conveying and storage processes when a transported product is transferred to a means of transport, when the goods are removed and the means of transport therefor is changed. The transfer of goods from the warehouse to the means of transport and vice versa is thus also transshipment. Transshipment is a process in which goods change means of transport, as is necessary in the case of combined traffic. By way of example, cargo, when being transported forward, changes from a truck at the port for the main route to a cargo ship or to a goods train at the goods station in order to be transported back to the receiver by a receiving carrier. The terms loading and unloading are used in particular synonymously with transshipment, or stand for loading. Sorting, storage, removal from storage and picking are also counted as part of transshipment. In DIN 30781-1, in the version valid on the date of filing of the present patent application, transshipment is defined as "All conveying and storage processes involved in the transfer of goods to a means of transport, in the removal of the goods from a means of transport and when goods change means of transport." The transshipment may be carried out manually, mechanically or automatically. Transshipment performance is the quantity of goods handled per unit of time (for example year, month, day, hour). Transshipment rate indicates how often the average annual stock of a warehouse is handled (warehouse turnover frequency). The stock may in this case be indicated in terms of value (for example in euros) or quantity (for example in tons).

The term "fluid medium", as used here, is a broad term that should be attributed its usual and common meaning as understood by a person skilled in the art. The term is not restricted to a specific or adapted meaning. The term may, without restriction, refer in particular to substances that continuously deform, that is to say flow, under the influence of shear forces. In particular, the term comprises not only matter in the liquid and gaseous aggregate state, that is to say gases and liquids, but also plasma, suspensions and aerosols.

The logistics system comprises at least one transshipment site.

The term "transshipment site", as used here, is a broad term that should be attributed its usual and common meaning as understood by a person skilled in the art. The term is not restricted to a specific or adapted meaning. The term may, without restriction, refer in particular to a transshipment device or facility. In other words, a transshipment site is a technical installation used to carry out the transshipment. The transshipment site accordingly comprises transshipment devices. The term should therefore not be confused with the transshipment point. The location of the transshipment is called transshipment point. The transshipment point may be located within a company premises as part of the internal flow of material (intralogistics). It may also be the interface between internal and external transport, for example when goods are loaded from the finished parts warehouse on a truck and transported to clients.

The transshipment site is configured to carry out at least one process selected from the group consisting of loading a mobile tank with the fluid medium and unloading the fluid medium from the mobile tank. It is explicitly pointed out that loading and unloading the mobile tank may be performed as separate processes. As an alternative, the mobile tank may be loaded and unloaded simultaneously. By way of example, loading may take place at one point of the mobile tank and unloading may take place at another point. It is also possible to create a circulatory flow of the fluid medium through simultaneous loading and unloading. Such a circulatory flow may be created for example in order to adjust certain physical or chemical properties of the fluid medium, such as for example temperature, pressure, aggregate state of the fluid medium.

The term "mobile tank", as used here, is a broad term that should be attributed its usual and common meaning as understood by a person skilled in the art. The term is not restricted to a specific or adapted meaning. The term may, without restriction, refer in particular to a device or apparatus for the temporary storage or retention of a fluid medium, which device or apparatus is movable and in particular transportable. The mobile tank may be in particular a movable vessel or container. Such a mobile tank may be transported by way of a truck, a train, a ship or an aircraft.

The transshipment site has at least one pipe system having at least one pipe connection.

The term "pipe system", as used here, is a broad term that should be attributed its usual and common meaning as understood by a person skilled in the art. The term is not restricted to a specific or adapted meaning. The term may, without restriction, refer in particular to a device or apparatus that consists of pipes, pipe connections or joints and the associated fittings. A pipe system is used to transport fluids and free-flowing or pumpable solids as well as to transfer mechanical and thermal energy.

The term "pipe connection", as used here, is a broad term that should be attributed its usual and common meaning as understood by a person skilled in the art. The term is not restricted to a specific or adapted meaning. The term may, without restriction, refer in particular to a component that is configured to couple pipe and hose lines and to connect fittings, pumps and the like. Pipe connections may also be referred to as pipe joints. Pipe connections are generally used simultaneously for sealing and for structural connection, that is to say for aligning the connected elements and for forwarding forces. Connections formed by screw fittings and molded parts may be detached later. Screw connections and sleeve joints may be detached without in the process dislocating the pipes. Pipe joints are selected according to operational requirements (detachability of the connection), operating conditions (pressure and temperature), medium and material of pipe sections and shaped parts (weldability). Purely structural pipe connectors without a sealing function are referred to as pipe connection element.

The logistics system furthermore comprises at least one controller.

The term "controller", as used here, is a broad term that should be attributed its usual and common meaning as understood by a person skilled in the art. The term is not restricted to a specific or adapted meaning. The term may, without restriction, refer in particular to a component that is configured to influence the behavior of a system. Control puts a system into a different state. The change in system behavior is brought about by information, message, stimulus or input. In particular, a controller is configured to bring about targeted influencing of the behavior of technical systems, such as for example apparatuses, devices, machines, installations and biological systems. A controller is usually an electronic unit.

The controller is programmed to control at least one function of the logistics system.

The logistics system furthermore comprises at least one movement system having at least one movement arm and an automatic coupling system.

The term "movement system", as used here, is a broad term that should be attributed its usual and common meaning as understood by a person skilled in the art. The term is not restricted to a specific or adapted meaning. The term may, without restriction, refer in particular to a system that moves a machine or a component. The movement may in this case be brought about electrically, electronically, mechanically, electromechanically or in any other way, for example by one or more motors, actuators or a combination thereof. The machine that is moved may be a machine tool, a component of a machine, an apparatus, a device and/or an installation. The movement system may in particular be a portal system, a machine tool with a gantry drive and/or a robot system.

The term "movement arm", as used here, is a broad term that should be attributed its usual and common meaning as understood by a person skilled in the art. The term is not restricted to a specific or adapted meaning. The term may, without restriction, refer in particular to an arm-shaped movement mechanism. The movement arm may in this case carry out a linear movement, that is to say with one degree of freedom, or a movement with multiple degrees of freedom. In the latter case, the movement arm comprises one or more articulations. By way of example, the movement arm is designed as a robot arm. Both linear movements and rotational movements may thereby be achieved.

The term "coupling system", as used here, is a broad term that should be attributed its usual and common meaning as understood by a person skilled in the art. The term is not restricted to a specific or adapted meaning. The term may, without restriction, refer in particular to a system having at least one coupling piece and further components. The coupling system thus comprises in particular a coupling piece and a pipe and/or a hose and/or one or more valves. The coupling piece may be what is known as a male or female coupling piece. A coupling refers in this case in particular to a detachable connection between segments of transport lines, such as for example pipelines, hoses or the like. They enable efficient and reliable connection and replacement of systems, units, devices, etc. The design depends on the intended use, the medium conveyed in the transport line (air, gases, water, oil, acid, etc.) and on the pressure conditions prevailing in the transport line (vacuum or overpressure). A coupling is composed in particular of two coupling pieces able to be connected to one another, that is to say the female coupling piece and the male coupling piece.

The movement arm is configured to move the coupling system. The movement may in this case be brought about by a movement of the movement arm. To this end, the movement arm may be able to be connected permanently or detachably to the coupling system.

The automatic coupling system is configured to automatically open at least one tank nozzle of the mobile tank. The automatic coupling system is furthermore configured to automatically open the pipe connection of the transshipment site. The automatic coupling system is furthermore configured to fluidically connect the tank nozzle and the pipe connection.

The term "automatic" or "automatically", as used here, is a broad term that should be attributed its usual and common meaning as understood by a person skilled in the art. The term is not restricted to a specific or adapted meaning. The term may, without restriction, refer in particular to a process that takes place without manual or further activity when a single working step is carried out. By way of example, the tank nozzle is thus opened as soon as the coupling system is connected thereto, without requiring any further working step.

The term "fluidically connected", as used here, is a broad term that should be attributed its usual and common meaning as understood by a person skilled in the art. The term is not restricted to a specific or adapted meaning. The term may, without restriction, refer in particular to a state that allows the fluid medium to flow.

The logistics system according to the invention allows the loading and/or unloading to be completely automated through automation and thereby makes it possible to operate the transshipment sites flexibly, sometimes with a high and sometimes with a lower number of mobile tanks to be loaded and unloaded. This also, for the first time, enables safeguarding concepts in which for example half of the products are intended to be transported by one mode of transport, such as for example inland waterway vessel, and the other half are intended to be transported by another mode of transport, such as for example rail. In the event of bottlenecks in one mode of transport, such as for example low water in inland waterway transport, it is thus possible to change flexibly to the other mode of transport. This is possible because automation means that the loading staff cannot form a bottleneck. The logistics system according to the invention in this case comprises the entire process from ordering, through delivery, positioning under the transshipment site, connection to the transshipment site, the unloading process or loading process, determining the correct loading or unloading weight, monitoring during loading and unloading, closing the mobile tank after loading and unloading is complete, signing off the mobile tank and transporting the mobile tank back.

The controller may be configured to clear or to block the fluid connection between the tank nozzle and the pipe connection. The controller may thus allow or prevent a flow through the connection between the tank nozzle and the pipe connection.

The logistics system may furthermore comprise at least one analysis apparatus for acquiring at least one parameter of the fluid medium.

The term "analysis apparatus", as used here, is a broad term that should be attributed its usual and common meaning as understood by a person skilled in the art. The term is not restricted to a specific or adapted meaning. The term may, without restriction, refer in particular to an apparatus that is configured to acquire and/or to examine at least one predetermined property of a substance or substance mixture. Such an apparatus may in particular be configured to carry out a systematic examination in which the object under examination is disassembled into its component parts (elements). These elements are in this case recorded on the basis of criteria and then ordered, examined and evaluated. Consideration is given in particular to relationships and effects (often: interdependencies) between the elements.

The logistics system is thus capable of determining the required demand, of calling up (ordering) mobile tanks for loading or unloading, of monitoring transport and of coordinating delivery in the case of delivery, of connecting the tank, of inspecting and approving the contents of the tank, of starting, monitoring and completing loading, and finally of signing off the tank for collection.

The controller may be configured to compare the at least one parameter with at least one specification and to clear or to block the fluid connection between the tank nozzle and the pipe connection according to the result of the comparison. In other words, the controller may inspect whether the fluid medium corresponds to a specification, and allow or prevent loading or unloading. By way of example, the product is inspected for correctness and purity. After quality approval has been given, the line is switched to the connected stationary tank, other mobile tank or pipeline to the consumer and the tank is emptied.

The parameter may be selected from the group consisting of: a chemical property of the fluid medium; a purity of the fluid medium; a physical property of the fluid medium; a type of the fluid medium; a filling quantity of the fluid medium inside the mobile tank. The chemical property of the fluid medium may in particular comprise solubility, reactivity, pH constants (acid and/or base constant), enthalpy values (combustion enthalpy), and the like. The chemical property of the fluid medium may comprise for example characteristic chemical reaction(s) with another fluid connection, color change caused by chemical or physical interaction with an indicator, enthalpy of the fluid connection, characteristic detectable chemical, physical or quantum chemical transitions as a result for example of energy irradiation. The physical property of the fluid medium may comprise for example pressure, temperature, tightness of the fluid connection, pressure loss of the fluid connection, substance density, aggregate state, electrical conductivity, viscosity, emission/absorption spectrum, refractive indices, boiling point of the fluid connection, refractive index of the fluid connection, color of the fluid connection, osmotic properties of the fluid connection or vapor pressure of the fluid connection.

The controller may be configured to detect a demand for transshipment of the fluid medium. The controller may furthermore be configured to automatically request at least one mobile tank for the transshipment and to provide it at the transshipment site according to the demand.

The mobile tank may in this case be requested through an appropriate order. By way of example, the order goes to a fully automated warehouse for mobile tanks or to a tank in transit. The order is given here to bring an appropriate mobile tank to the transshipment site. In the fully automated case, the corresponding mobile tank in the tank container warehouse is picked by an automatic crane and loaded onto a provided AGV chassis. This is transported, via an order to be set by the controller, to the loading site by an AGV (automatic transport system for mobile tanks). The AGV in this case positions the tank exactly below the transshipment site so that the mobile tank is able to be connected automatically. In systems that are not fully automated, the positioning at the loading site is carried out, using an orientation mark, by a driver, such as for example on a tanker, TC (tank container) or BTC (BASF Class Tank Container) on a truck chassis, by a train driver, such as for example on a tank wagon, tank container or BTC on carrier wagons, or by the captain, such as for example of a inland tanker. After the controller has positioned and recognized the mobile tank, the controller gives the movement system the command to connect the mobile tank. To this end, the movement system is fixedly mounted for example at the top of the transshipment site. The movement system is equipped with specially developed couplings that allow reliable and efficient connection and closure of the mobile tank. Another option, which is likewise part of this patent application, is to set up the movement system at the bottom, but mounting the movement arm at the top makes more sense.

The logistics system may furthermore have at least one warehouse for multiple mobile tanks. This makes it possible to provide a buffer for the fluid or various fluids, which increases the flexibility and capacity of the logistics system.

The mobile tank may be mounted on a driverless industrial truck. The mobile tank may thereby also be transported or provided automatically, which reduces the deployment of staff and thus resources.

The term "industrial truck", as used here, is a broad term that should be attributed its usual and common meaning as understood by a person skilled in the art. The term is not restricted to a specific or adapted meaning. The term may, without restriction, refer in particular to a means of convey-ance that is used on level ground for the horizontal transport of goods. The term is used synonymously with transport vehicle. Counterparts are floor-free means of conveyance that either hang on hall ceilings or use rails. Industrial trucks may be divided into trackless industrial trucks, such as for example pallet trucks, towing vehicles, forklift trucks, etc., rail-bound industrial trucks, such as for example trolleys, rail vehicles, and track-guided industrial trucks, such as for example driverless transport systems. Industrial trucks may in particular be means of conveyance that are characterized, in terms of their design, in that they run on the floor with wheels and are freely steerable, configured to transport, pull or push loads and intended for internal use. A driverless industrial truck, or automated guided vehicle (AGV), is a floor-bound means of conveyance with its own drive, which is controlled automatically and guided contactlessly. Driv-erless industrial trucks are used to transport material, namely to pull or carry conveyed goods using active or passive load-carrying means. Driverless transport systems are inter-nal, floor-bound conveyor systems having automatically controlled vehicles whose primary task is to transport mate-rial, but not to transport people. They are used inside and outside buildings and essentially consist of the following components: one or more driverless transport vehicles, a master controller, location determination and position detec-tion devices, data transmission devices, infrastructure and peripheral devices.

The pipe connection may comprise at least one hose. The hose may be connected, or able to be connected, to the coupling system. The movement arm may be designed to grip and to move the hose. In contrast to a comparatively rigid pipe, a hose has the advantage that it is flexible and may therefore be moved more easily to a target position.

The term "hose", as used here, is a broad term that should be attributed its usual and common meaning as understood by a person skilled in the art. The term is not restricted to a specific or adapted meaning. The term may, without restric-tion, refer in particular to a flexible elongated hollow body with a mostly round cross section, in contrast to the inflex-ible pipe. The term hose line refers to a hose that has been installed for permanent use. The innermost sealing layer of a hose is referred to as an inner tube. The outermost layer is called a cover. In between them is often an inlay made of fabric or wound fibers or wire that increases the dimensional stability and compressive strength of the hose. Similarly to corrugated pipes and empty pipes, suction hoses are often equipped with a spiral made of plastic or steel wire in order to increase cross-sectional stability. In many cases, hoses are used as hose lines to transport materials. For instance, if fixed pipelines are too difficult or too complex to mount and if connection or outlet points are movable.

The movement arm may be designed to remove a cover from the tank nozzle of the mobile tank. As an alternative or in addition, the movement arm may be designed to attach a cover on the tank nozzle of the mobile tank. Accordingly, the cover may be removed from the tank nozzle or attached thereto without the need for staff and thus in a resource-saving manner.

The term "cover", as used here, is a broad term that should be attributed its usual and common meaning as understood by a person skilled in the art. The term is not restricted to a specific or adapted meaning. The term may, without restric-tion, refer in particular to a cover that is used to protect the tank nozzle from contamination and/or damage.

The transshipment site may furthermore comprise at least one tank sensor. The tank sensor may be configured to detect a position and/or type of the tank nozzle of the mobile tank. The result of the detection performed by such a tank sensor may be used to guide the movement arm with the correct coupling to the correct position, in order to allow automatic connection of the pipe connection.

The tank sensor may have at least one optical sensor, a camera, a laser sensor, a lidar sensor, a mechanical sensor, such as for example a probe, an inductive sensor, an ultra-sound sensor and/or an infrared sensor.

The transshipment site may furthermore comprise at least one cleaning apparatus. The cleaning apparatus may be configured to at least externally clean the tank nozzle of the mobile tank. This ensures that there is no contamination of the fluid during loading or unloading.

The term "cleaning apparatus", as used here, is a broad term that should be attributed its usual and common mean-ing as understood by a person skilled in the art. The term is not restricted to a specific or adapted meaning. The term may, without restriction, refer in particular to an apparatus that is configured to at least partially remove protection or undesirable particles, deposits and the like. The cleaning effect may in this case be physical, chemical and/or mechanical.

The transshipment site may furthermore be configured to control the temperature of the mobile tank. This allows the fluid inside the mobile tank to be brought to and kept at a predetermined temperature.

The term "control the temperature" and its grammatical equivalents, as used here, is a broad term that should be attributed its usual and common meaning as understood by a person skilled in the art. The term is not restricted to a specific or adapted meaning. The term may, without restric-tion, refer in particular to an activity in which the fluid medium is brought to a predetermined temperature. The temperature may in this case be adjusted through control and/or regulation.

The transshipment site may in particular be configured to heat or to cool the mobile tank. A temperature of the fluid may thus be set.

The transshipment site may be designed for the detach-able connection of a temperature control connection to the mobile tank. The temperature control may thereby be carried out according to demand. A detachable connection also saves more space and allows more flexibility.

The term "temperature control connection", as used here, is a broad term that should be attributed its usual and common meaning as understood by a person skilled in the art. The term is not restricted to a specific or adapted meaning. The term may, without restriction, refer in particular to a connection that is able to be connected to the mobile tank in order to supply and/or dissipate heat. The heat may in this case be supplied and/or dissipated electrically and/or by way of a heat carrier, such as for example a liquid.

The movement system may be designed for the detachable connection of the temperature control connection to the mobile tank. The movement system is thus able to move not only the coupling system to its target position(s), but also the temperature control connection. This further reduces the need for staff and increases flexibility.

The transshipment site may furthermore have at least one monitoring apparatus. The monitoring apparatus may be configured to monitor a loading state of the mobile tank. This makes it possible to reliably prevent incorrect filling, that is to say deviations from a target quantity of fluid, of the mobile tank.

The automatic coupling system may have at least one coupling piece. The automatic coupling piece may be configured to automatically open the at least one tank nozzle of the mobile tank through placement of the coupling piece. The tank nozzle may thus be opened without any further working step during placement of the coupling piece, which reduces the number of working steps.

The transshipment site may furthermore have at least one accessible platform. This allows an operator or employee to monitor the functions of the logistics system.

The term "accessible platform", as used here, is a broad term that should be attributed its usual and common meaning as understood by a person skilled in the art. The term is not restricted to a specific or adapted meaning. The term may, without restriction, refer in particular to a limited, level, elevated area that is accessible to at least one person.

The accessible platform may have a floor with an opening and a door. In particular, the accessible platform may have a flap and/or a sliding door. The door may be designed to selectively close and release the opening. The floor may be arranged at a height that exceeds a height of the mobile tank. A top of the mobile tank may thereby be made accessible to an operator or employee.

The floor of the accessible platform may be arranged above the mobile tank during loading and/or unloading of the mobile tank. A top of the mobile tank may thereby be made accessible to an operator or employee only if a mobile tank is located underneath. This increases occupational safety and prevents the employee from accidentally falling.

The controller may be configured to release the opening by moving the door when the mobile tank is located at a predetermined position below the floor. A top of the mobile tank may thereby be made accessible to an operator or employee only if a mobile tank is located underneath. This increases occupational safety and prevents the employee from accidentally falling.

The logistics system may furthermore comprise at least one mobile tank.

The movement system may be a robot system. The movement arm may be a robot arm. This makes it possible to achieve movements with a plurality of degrees of freedom.

In a further of the present invention, what is proposed is a method for the automatic transshipment of at least one fluid medium using at least one logistics system according to one of the embodiments described above or below. The method comprises the method steps described below, which may preferably, but not necessarily, be carried out in the order set forth. Furthermore, one or more method steps may also be carried out simultaneously or in a temporally overlapping manner. Furthermore, one or more method steps or all methods steps may also be carried out repeatedly. The method may comprise further method steps in addition to the method steps set forth. The method comprises the following steps:

i. bringing the at least one mobile tank to the transshipment site;

ii. automatically opening the at least one pipe connection of the transshipment site by way of the automatic coupling system;

iii. automatically opening the at least one tank nozzle of the mobile tank by way of the automatic coupling system;

iv. establishing at least one fluid connection between the tank nozzle and the pipe connection by way of the automatic coupling system; and v. carrying out at least one process selected from the group consisting of: loading the mobile tank with the fluid medium from the pipe system of the transshipment site; unloading the fluid medium from the mobile tank into the pipe system of the transshipment site.

The method according to the invention allows the loading and/or unloading to be completely automated through automation and thereby makes it possible to operate the transshipment sites flexibly, on the one hand with a high and on the other hand with a lower number of mobile tanks to be loaded and unloaded. This also, for the first time, enables safeguarding concepts in which for example half of the products are intended to be transported by one mode of transport, such as for example inland waterway vessel, and the other half are intended to be transported by another mode of transport, such as for example rail. In the event of bottlenecks in one mode of transport, such as for example low water in inland waterway transport, it is thus possible to change flexibly to the other mode of transport. This is possible because automation means that the loading staff cannot form a bottleneck. The logistics system according to the invention in this case comprises the entire process from ordering, through delivery, positioning under the transshipment site, connection to the transshipment site, the unloading process or loading process, determining the correct loading or unloading weight, monitoring during loading and unloading, closing the mobile tank after loading and unloading is complete, signing off the mobile tank and transporting the mobile tank back.

The term "bringing the at least one mobile tank to the transshipment site", as used here, is a broad term that should be attributed its usual and common meaning as understood by a person skilled in the art. The term is not restricted to a specific or adapted meaning. The term may, without restriction, refer in particular to a process in which the mobile tank is provided at the transshipment site. To this end, the mobile tank may be moved, in particular transported, to the transshipment site.

The method may be computer-controlled by the controller. The degree of automation is thereby increased.

The term "computer-controlled", as used here, is a broad term that should be attributed its usual and common meaning as understood by a person skilled in the art. The term is not restricted to a specific or adapted meaning. The term may, without restriction, refer in particular to a function or a process that is carried out at least partially using a computer program.

The method may furthermore comprise clearing or blocking the fluid connection between the tank nozzle and the pipe connection by way of the controller. The controller may thus allow or prevent a flow through the connection between the tank nozzle and the pipe connection.

The method may furthermore comprise acquiring at least one parameter of the fluid medium.

The method may furthermore comprise comparing the at least one parameter with at least one specification and clearing or blocking the fluid connection between the tank nozzle and the pipe connection according to the result of the comparison. In other words, the controller may inspect whether the fluid medium corresponds to a specification, and allow or prevent loading or unloading. By way of example, the product is inspected for correctness and purity. After quality approval has been given, the line is switched to the connected stationary tank, other mobile tank or pipeline to the consumer and the tank is emptied.

The method may furthermore comprise detecting a demand for transshipment of the fluid medium, and automatically requesting and providing, at the transshipment site, at least one mobile tank for the transshipment according to the demand. The mobile tank may in this case be requested through an appropriate order. By way of example, the order goes to a fully automated warehouse for mobile tanks or to a tank in transit. The order is given here to bring an appropriate mobile tank to the transshipment site. In the fully automated case, the corresponding mobile tank in the tank container warehouse is picked by an automatic crane and loaded onto a provided AGV chassis. This is transported, via an order to be set by the controller, to the loading site by an AGV (automatic transport system for mobile tanks). The AGV in this case positions the tank exactly below the transshipment site so that the mobile tank is able to be connected automatically. In systems that are not fully automated, the positioning at the loading site is carried out, using an orientation mark, by a driver, such as for example on a tanker, TC or BTC on a truck chassis, by a train driver, such as for example on a tank wagon, tank container or BTC on carrier wagons, or by the captain, such as for example of a inland tanker. After the controller has positioned and recognized the mobile tank, the controller gives the movement system the command to connect the mobile tank. To this end, the movement system is fixedly mounted for example at the top of the transshipment site. The movement system is equipped with specially developed couplings that allow reliable and efficient connection and closure of the mobile tank. Another option, which is likewise part of this patent application, is to set up the movement system at the bottom, but mounting the movement arm at the top makes more sense.

The mobile tank may be brought on a driverless industrial truck. The mobile tank may thereby also be transported or provided automatically, which reduces the deployment of staff and thus resources.

The pipe connection may comprise at least one hose. The method may furthermore comprise gripping and moving the hose by way of the movement arm. The hose may be connected, or able to be connected, to the coupling system. The movement arm may be designed to grip and to move the hose. In contrast to a comparatively rigid pipe, a hose has the advantage that it is flexible and may therefore be moved more easily to a target position.

The method may furthermore comprise removing and/or attaching a cover from and/or on the tank nozzle of the mobile tank by way of the movement arm. Accordingly, the cover may be removed from the tank nozzle or attached thereto without the need for staff and thus in a resource-saving manner.

The method may furthermore comprise detecting a position and/or type of the tank nozzle of the mobile tank. The result of the detection performed by such a tank sensor may be used to guide the movement arm with the correct coupling to the correct position, in order to allow automatic connection of the pipe connection.

The method may furthermore comprise at least externally cleaning the tank nozzle of the mobile tank. This ensures that there is no contamination of the fluid during loading or unloading.

The method may furthermore comprise controlling the temperature of, in particular heating or cooling, the mobile tank. This allows the fluid inside the mobile tank to be brought to and kept at a predetermined temperature.

The method may furthermore comprise detachably connecting a temperature control connection to the mobile tank. The temperature control may thereby be carried out according to demand. A detachable connection also saves more space and allows more flexibility.

The temperature control connection may be connected detachably to the mobile tank by way of a movement arm. The movement system is thus able to move not only the coupling system to its target position(s), but also the temperature control connection. This further reduces the need for staff and increases flexibility.

The method may furthermore comprise monitoring a loading state of the mobile tank. This makes it possible to reliably prevent incorrect filling, that is to say deviations from a target quantity of fluid, of the mobile tank.

The transshipment site may furthermore have at least one accessible platform. The accessible platform may have a floor with an opening and a door, in particular a flap and/or a sliding door. The floor may be arranged at a height that exceeds a height of the mobile tank. The method may furthermore comprise selectively closing and releasing the opening by way of the door. This allows an operator or employee to monitor the functions of the logistics system. A top of the mobile tank may thereby be made accessible to an operator or employee.

The method may furthermore comprise releasing the opening by moving the door when the mobile tank is located at a predetermined position below the floor. A top of the mobile tank may thereby be made accessible to an operator or employee only if a mobile tank is located underneath. This increases occupational safety and prevents the employee from accidentally falling.

The mobile tank may have a tank number. The method may furthermore comprise recording the tank number of the mobile tank by way of a sensor or an OCR system, comparing the recorded tank number with a tank number stored in a database, verifying the recorded tank number for correctness and releasing the mobile tank for loading and/or unloading if the verification of the tank number of the mobile tank is correct. This increases safety when handling the contents of the mobile tank.

By way of example, the recorded tank number may be compared with a tank number stored in an order.

The tank number may be verified for correctness using a check digit.

The method may furthermore recognize an identifier of the mobile tank using a sensor or an OCR system and attach labels or warning signs or remove or conceal old labels or warning signs by way of a machine for labeling mobile tanks in accordance with the specifications in a computer program. The system is thereby also capable of attaching the proper and correct hazardous goods identifier to the mobile tank after loading and/or unloading.

The identifier may in particular be a hazardous goods identifier.

In a further aspect of the present invention, what is furthermore proposed is a computer program product comprising commands that cause the logistics system, according to one of the embodiments described above or below in relation to a logistics system, to carry out the method steps according to one of the embodiments described above or below in relation to a method.

In a further aspect of the present invention, what is proposed is a computer-readable medium, in particular a non-volatile computer-readable medium, on which the computer program according to the embodiment described above is stored.

What is also proposed as part of the present invention is a computer program that, when it is executed on a computer or computer network, performs the method according to the invention in one of its embodiments.

What is furthermore proposed as part of the present invention is a computer program containing program code means for carrying out the method according to the invention in one of its embodiments when the program is executed on a computer or computer network.

The program code means may in particular be stored on a computer-readable data carrier and/or a computer-readable storage medium.

The terms "computer-readable data carrier" and "computer-readable storage medium", as used here, may refer in particular to non-transitory data memories, for example a hardware data storage medium on which computer-executable instructions are stored. The computer-readable data carrier or the computer-readable storage medium may in particular be or comprise a storage medium such as a random-access memory (RAM) and/or a read-only memory (ROM).

What is additionally proposed as part of the present invention is a data carrier on which there is stored a data structure that, after being loaded into a working and/or main memory of a computer or computer network, is able to perform the method according to the invention in one of its embodiments.

What is furthermore proposed as part of the present invention is a non-transient computer-readable medium comprising instructions that, when they are executed by one or more processors, cause the one or more processors to.

What is also proposed as part of the present invention is a computer program product containing program code means, stored on a machine-readable carrier, for carrying out the method according to the invention in one of its embodiments when the program is executed on a computer or computer network.

A computer program product is understood here to mean the program as a tradable product. It may in principle be in any form, such as for example on paper or a computer-readable data carrier, and may be distributed in particular over a data transmission network.

What is proposed lastly as part of the present invention is a modulated data signal that contains instructions, able to be executed by a computer system or computer network, for performing a method according to one of the described embodiments.

With regard to the computer-implemented aspects of the invention, one, several or even all of the method steps of the method according to one or more of the embodiments proposed here may be carried out by way of a computer or computer network. Thus, generally speaking, any of the method steps, including the provision and/or manipulation of data, may be carried out by way of a computer or computer network. These steps may generally comprise any of the method steps, except the steps that require manual work, for example the provision of samples and/or certain aspects of carrying out actual measurements.

In summary, without restricting further possible embodiments, the following embodiments are proposed:

Embodiment 1: A logistics system for the automatic transshipment of at least one fluid medium, comprising at least one transshipment site, wherein the transshipment site is configured to carry out at least one process selected from the group consisting of loading a mobile tank with the fluid medium and unloading the fluid medium from the mobile tank, wherein the transshipment site has at least one pipe system having at least one pipe connection; and at least one controller, wherein the controller is programmed to control at least one function of the logistics system; and at least one movement system having at least one movement arm and an automatic coupling system, wherein the movement arm is configured to move the coupling system, wherein the automatic coupling system is configured to automatically open at least one tank nozzle of the mobile tank, wherein the automatic coupling system is furthermore configured to automatically open the pipe connection of the transshipment site, and wherein the automatic coupling system is furthermore configured to fluidically connect the tank nozzle and the pipe connection.

Embodiment 2: The logistics system according to the preceding embodiment, wherein the controller is configured to clear or to block the fluid connection between the tank nozzle and the pipe connection.

Embodiment 3: The logistics system according to either of the preceding embodiments, furthermore comprising at least one analysis apparatus for acquiring at least one parameter of the fluid medium.

Embodiment 4: The logistics system according to the preceding embodiment, wherein the controller is configured to compare the at least one parameter with at least one specification and to clear or to block the fluid connection between the tank nozzle and the pipe connection according to the result of the comparison.

Embodiment 5: The logistics system according to either of the two preceding embodiments, wherein the parameter is selected from the group consisting of: a chemical property of the fluid medium; a purity of the fluid medium; a physical property of the fluid medium, a type of the fluid medium, a filling quantity of the fluid medium inside the mobile tank.

Embodiment 6: The logistics system according to one of the preceding embodiments, wherein the controller is configured to detect a demand for transshipment of the fluid medium, wherein the controller is furthermore configured to automatically request at least one mobile tank for the transshipment and to provide it at the transshipment site according to the demand.

Embodiment 7: The logistics system according to the preceding embodiment, wherein the logistics system furthermore has at least one warehouse for multiple mobile tanks.

Embodiment 8: The logistics system according to one of the preceding embodiments, wherein the mobile tank is mounted on a driverless industrial truck.

Embodiment 9: The logistics system according to one of the preceding embodiments, wherein the pipe connection comprises at least one hose, wherein the hose is connected, or able to be connected, to the coupling system, wherein the movement arm is designed to grip and to move the hose.

Embodiment 10: The logistics system according to either of the two preceding embodiments, wherein the movement arm is designed to remove and/or attach a cover from and/or on the tank nozzle of the mobile tank.

Embodiment 11: The logistics system according to one of the preceding embodiments, wherein the transshipment site furthermore comprises at least one tank sensor, wherein the tank sensor is configured to detect a position and/or type of the tank nozzle of the mobile tank.

Embodiment 12: The logistics system according to the preceding embodiment, wherein the tank sensor has at least one optical sensor, a camera, a laser sensor, a lidar sensor, a mechanical sensor, an inductive sensor, an ultrasound sensor and/or an infrared sensor.

Embodiment 13: The logistics system according to one of the preceding embodiments, wherein the transshipment site furthermore comprises at least one cleaning apparatus, wherein the cleaning apparatus is configured to at least externally clean the tank nozzle of the mobile tank.

Embodiment 14: The logistics system according to one of the preceding embodiments, wherein the transshipment site is furthermore configured to control the temperature of, in particular to heat or to cool, the mobile tank.

Embodiment 15: The logistics system according to the preceding embodiment, wherein the transshipment site is designed for the detachable connection of a temperature control connection to the mobile tank.

Embodiment 16: The logistics system according to the preceding embodiment, wherein the movement system is designed for the detachable connection of the temperature control connection to the mobile tank.

Embodiment 17: The logistics system according to one of the preceding embodiments, wherein the transshipment site furthermore has at least one monitoring apparatus, wherein the monitoring apparatus is configured to monitor a loading state of the mobile tank.

Embodiment 18: The logistics system according to one of the preceding embodiments, wherein the automatic coupling system has at least one coupling piece, wherein the automatic coupling piece is configured to automatically open the at least one tank nozzle of the mobile tank through placement of the coupling piece.

Embodiment 19: The logistics system according to one of the preceding embodiments, wherein the transshipment site furthermore has at least one accessible platform, wherein the accessible platform has a floor with an opening and a door, in particular a flap and/or a sliding door, wherein the door is designed to selectively close and release the opening, wherein the floor is arranged at a height that exceeds a height of the mobile tank.

Embodiment 20: The logistics system according to the preceding embodiment, wherein the floor of the accessible platform is arranged above the mobile tank during loading and/or unloading of the mobile tank.

Embodiment 21: The logistics system according to one of the preceding embodiments, wherein the controller is configured to release the opening by moving the door when the mobile tank is located at a predetermined position below the floor.

Embodiment 22: The logistics system according to one of the preceding embodiments, furthermore comprising at least one mobile tank.

Embodiment 23: The logistics system according to one of the preceding embodiments, wherein the movement system is a robot system, wherein the movement arm is a robot arm.

Embodiment 24: A method for the transshipment of at least one fluid medium using at least one logistics system according to one of the preceding embodiments, wherein the method comprises:

(i) bringing the at least one mobile tank to the transshipment site;

(ii) automatically opening the at least one pipe connection of the transshipment site by way of the automatic coupling system;

(iii) automatically opening the at least one tank nozzle of the mobile tank by way of the automatic coupling system;

(iv) establishing at least one fluid connection between the tank nozzle and the pipe connection by way of the automatic coupling system; and (v) carrying out at least one process selected from the group consisting of: loading the mobile tank with the fluid medium from the pipe system of the transshipment site; unloading the fluid medium from the mobile tank into the pipe system of the transshipment site.

Embodiment 25: The method according to the preceding embodiment, wherein the method is computer-controlled by the controller.

Embodiment 26: The method according to either of the preceding method embodiments, furthermore comprising clearing or blocking the fluid connection between the tank nozzle and the pipe connection by way of the controller.

Embodiment 27: The method according to one of the preceding method embodiments, furthermore comprising acquiring at least one parameter of the fluid medium.

Embodiment 28: The method according to the preceding embodiment, furthermore comprising comparing the at least one parameter with at least one specification and clearing or blocking the fluid connection between the tank nozzle and the pipe connection according to the result of the comparison.

Embodiment 29: The method according to one of the preceding method embodiments, furthermore comprising detecting a demand for transshipment of the fluid medium, and automatically requesting and providing, at the transshipment site, at least one mobile tank for the transshipment according to the demand.

Embodiment 30: The method according to one of the preceding method embodiments, wherein the mobile tank is brought on a driverless industrial truck.

Embodiment 31: The method according to one of the preceding method embodiments, wherein the pipe connection comprises at least one hose, wherein the method furthermore comprises gripping and moving the hose by way of the movement arm.

Embodiment 32: The method according to the preceding embodiment, furthermore comprising removing and/or attaching a cover from and/or on the tank nozzle of the mobile tank by way of the movement arm.

Embodiment 33: The method according to one of the preceding method embodiments, furthermore comprising detecting a position and/or type of the tank nozzle of the mobile tank.

Embodiment 34: The method according to one of the preceding method embodiments, furthermore comprising at least externally cleaning the tank nozzle of the mobile tank.

Embodiment 35: The method according to one of the preceding method embodiments, furthermore comprising controlling the temperature of, in particular heating or cooling, the mobile tank.

Embodiment 36: The method according to the preceding embodiment, furthermore comprising detachably connecting a temperature control connection to the mobile tank.

Embodiment 37: The method according to the preceding embodiment, wherein the temperature control connection is connected detachably to the mobile tank by way of a movement arm.

Embodiment 38: The method according to one of the preceding method embodiments, furthermore comprising monitoring a loading state of the mobile tank.

Embodiment 39: The method according to one of the preceding method embodiments, wherein the transshipment site furthermore comprises at least one accessible platform, wherein the accessible platform has a floor with an opening and a door, in particular a flap and/or a sliding door, wherein the floor is arranged at a height that exceeds a height of the mobile tank, wherein the method furthermore comprises selectively closing and releasing the opening by way of the door.

Embodiment 40: The method according to the preceding embodiment, furthermore comprising releasing the opening by moving the door when the mobile tank is located at a predetermined position below the floor.

Embodiment 41: The method according to one of the preceding method embodiments, furthermore comprising recording the tank number of the mobile tank by way of a sensor or an OCR system, comparing the recorded tank number with a tank number stored in a database, verifying the recorded tank number for correctness and releasing the mobile tank for loading and/or unloading if the verification of the tank number of the mobile tank is correct.

Embodiment 42: The method according to one of the preceding method embodiments, furthermore comprising detecting an identifier of the mobile tank using a sensor or an OCR system and attaching labels or warning signs or removing or concealing old labels or warning signs by way of a machine for labeling mobile tanks in accordance with specifications in a computer program.

Embodiment 43: A computer program product comprising commands that cause the logistics system according to one of the preceding embodiments in relation to a logistics system to carry out the method steps according to one of the preceding embodiments in relation to a method.

Embodiment 44: A computer-readable medium, in particular a non-volatile computer-readable medium, on which the computer program according to the preceding embodiment is stored.

BRIEF DESCRIPTION OF THE FIGURES

Further details and features will become apparent from the following description of examples, in particular in connection with the dependent claims. The respective features may in this case be implemented on their own, or two or more may be implemented in combination with one another. The invention is not restricted to the examples. The examples are illustrated diagrammatically in the figures. Identical reference numerals in the individual figures relate to elements that are the same or have the same function, or correspond to one another in terms of their functions.

In detail.

DESCRIPTION OF THE EXAMPLES

Figure 1:
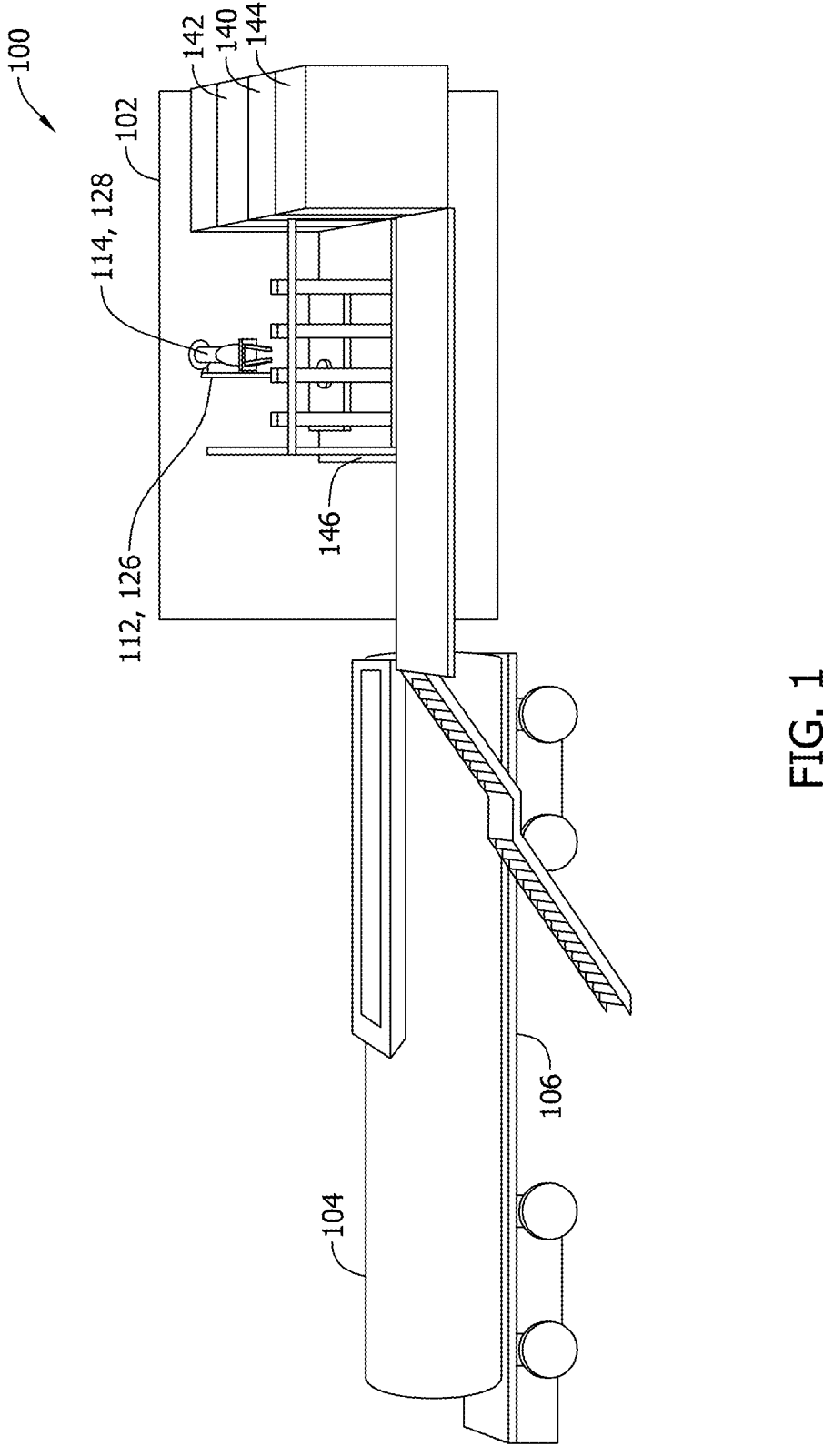
FIG. 1 shows a perspective view of a logistics system according to the invention.

FIG. 1 shows a perspective view of a logistics system 100 according to the invention. The logistics system 100 is configured for the automatic transshipment of at least one fluid medium. FIGS. 2 to 15 show further perspective views of the logistics system 100, which illustrate various details and various stages of a method according to the invention as described in more detail below. The fluid medium may in principle be a liquid and/or a gas. The logistics system 100 comprises at least one transshipment site 102. The transshipment site 102 is configured to carry out at least one process selected from the group consisting of loading a mobile tank 104 with the fluid medium and unloading the fluid medium from the mobile tank 104. The transshipment site 102 is stationary. As an alternative, the transshipment site 102 may be mobile. The mobile tank 104 is mounted, for example mounted detachably, on a driverless industrial truck 106. The mobile tank 104 may in this case be part of the logistics system 100, but may alternatively be part of a separate system or independent. The transshipment site 102 has at least one pipe system 108. The pipe system 108 has at least one pipe connection 110. By way of example, the pipe system 108 of the transshipment site 102 has multiple pipe connections 110.

Figure 2:
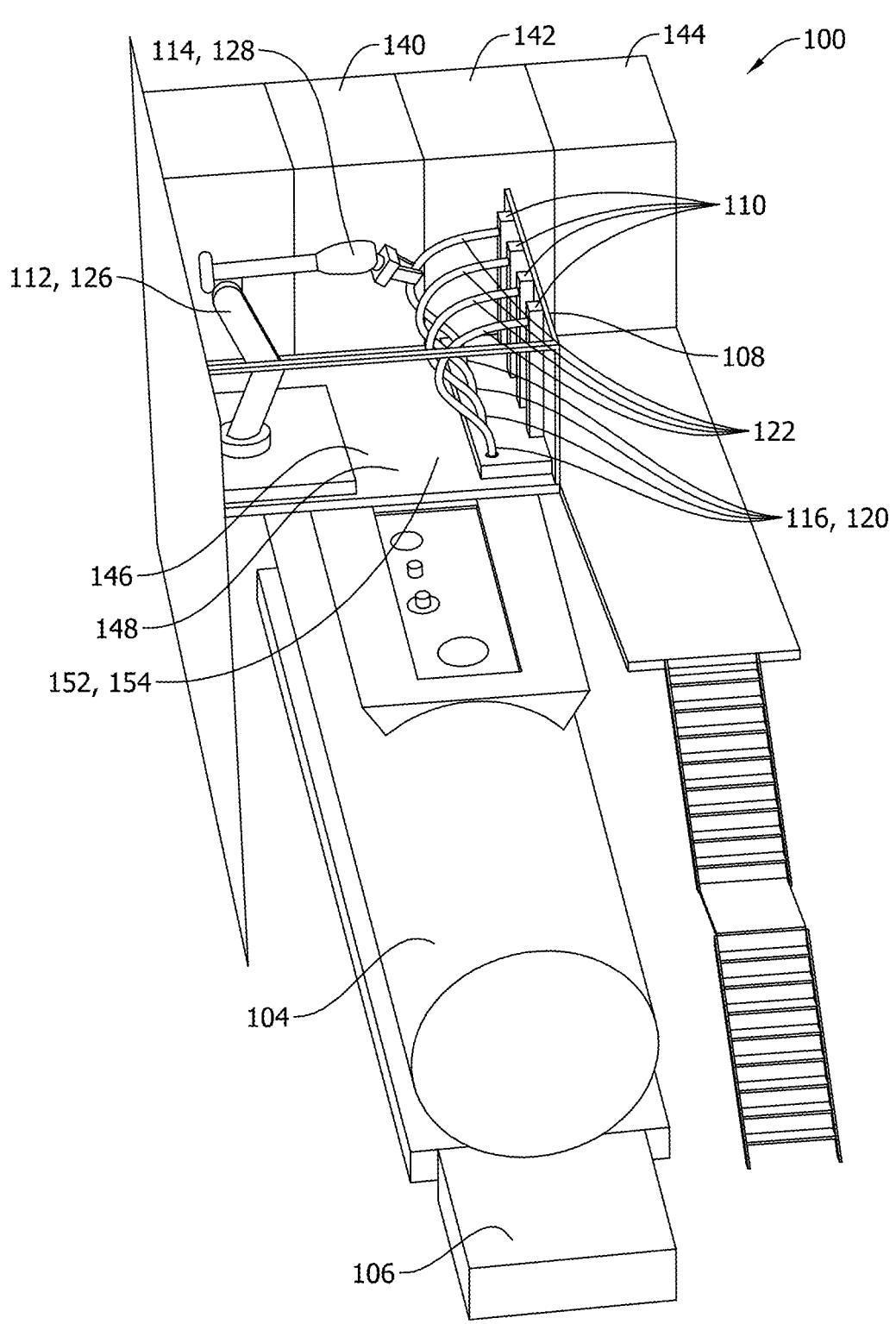
FIG. 2 shows a further perspective view of the logistics system according to the invention.
Figure 3:
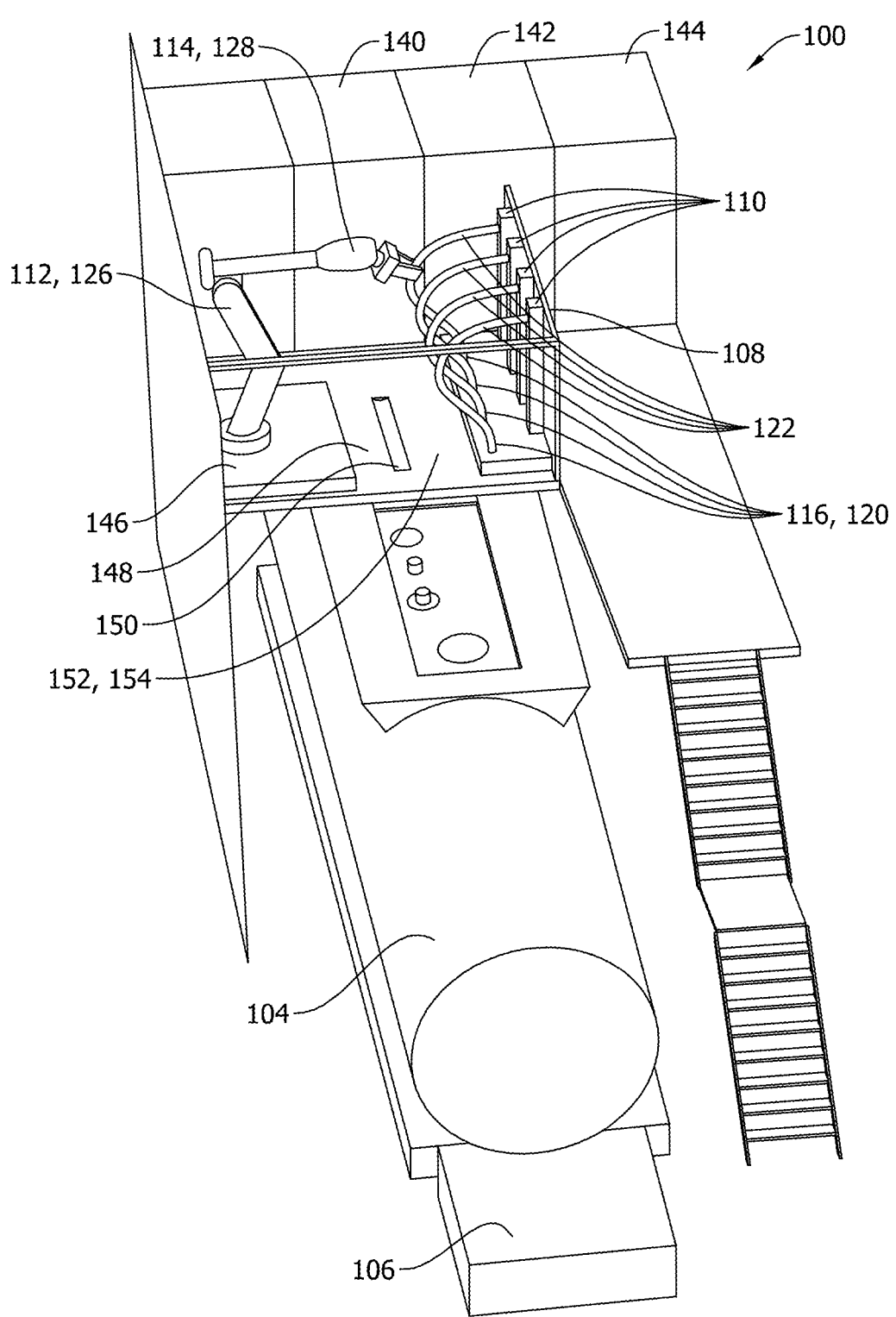
FIG. 3 shows a further perspective view of the logistics system according to the invention.

As may be seen, inter alia, in FIGS. 2 and 3, the logistics system 100 furthermore comprises at least one movement system 112. The movement system 112 has at least one movement arm 114 and an automatic coupling system 116. The movement arm 114 is configured to move the coupling system 116. The automatic coupling system 116 is configured to automatically open at least one tank nozzle 118 of the mobile tank 104. The automatic coupling system 116 is furthermore configured to automatically open the pipe connection 110 of the transshipment site 102. The automatic coupling system 116 is furthermore configured to fluidically connect the tank nozzle 118 and the pipe connection 110. To this end, the automatic coupling system 116 has at least one coupling piece 120. The automatic coupling piece 120 is configured to automatically open the at least one tank nozzle 118 of the mobile tank 104 through placement of the coupling piece 120. The automatic coupling piece 120 is thus designed in particular to open a valve arranged in or on the tank nozzle 118 as soon as the coupling piece 120 is placed on the tank nozzle 118 or is arranged thereon. The coupling system 116 may in principle be any coupling system that operates in the manner of a quick coupling, as in the case of a hose coupling. By way of example, the coupling system 116 may comprise a through-coupling, self-sealing coupling or what is known as a clean-break coupling.

The pipe connection 110 comprises at least one hose 122. The hose 122 is connected, or able to be connected, to the coupling system 116. The movement arm 114 is designed to grip and to move the hose 122. The movement arm 114 is furthermore designed to remove a cover 124 from the tank nozzle 118 of the mobile tank 104. As an alternative or in addition, the movement arm 114 is designed to attach a cover 124 on the tank nozzle 118 of the mobile tank 104. The movement system 112 in the embodiment shown is a robot system 126. The movement arm 114 is in this case a robot arm 128. As an alternative or in addition, the movement system 114 may be a portal system or a machine tool with a gantry drive.

Figure 4:
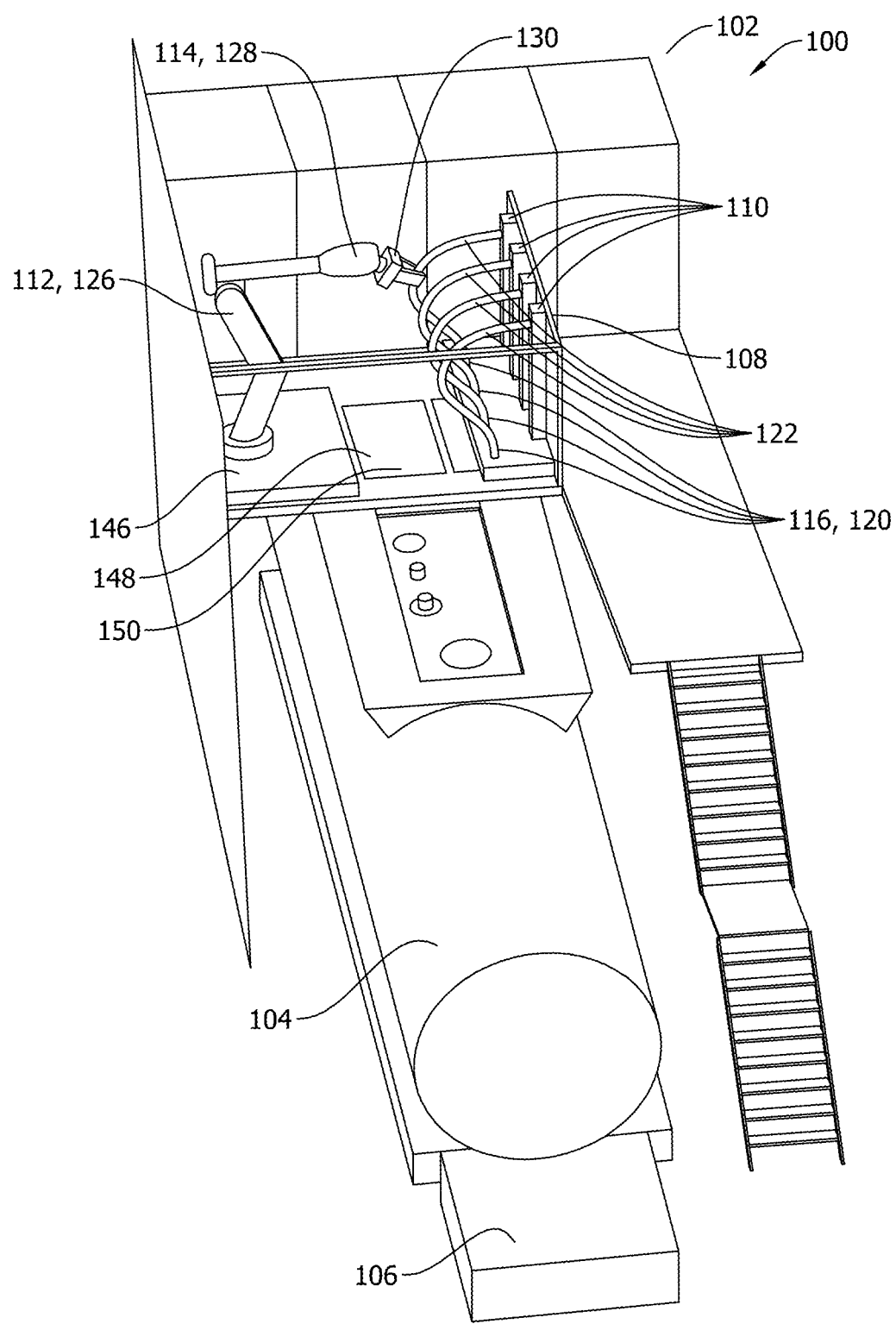
FIG. 4 shows a further perspective view of the logistics system according to the invention.

As may be seen in FIG. 4, the transshipment site 102 furthermore comprises at least one tank sensor 130. The tank sensor 130 is configured to detect a position and/or type of the tank nozzle 118 of the mobile tank 104. To this end, the tank sensor 130 has at least one optical sensor, a laser sensor, a probe, an inductive sensor and/or an infrared sensor. The tank sensor 130 is in particular connected fixedly to the movement arm 114. As an alternative, the tank sensor 130 may be connected detachably to the movement arm 114. By way of example, the movement arm 114 may be designed to grip and move the tank sensor 130.

Figure 5:
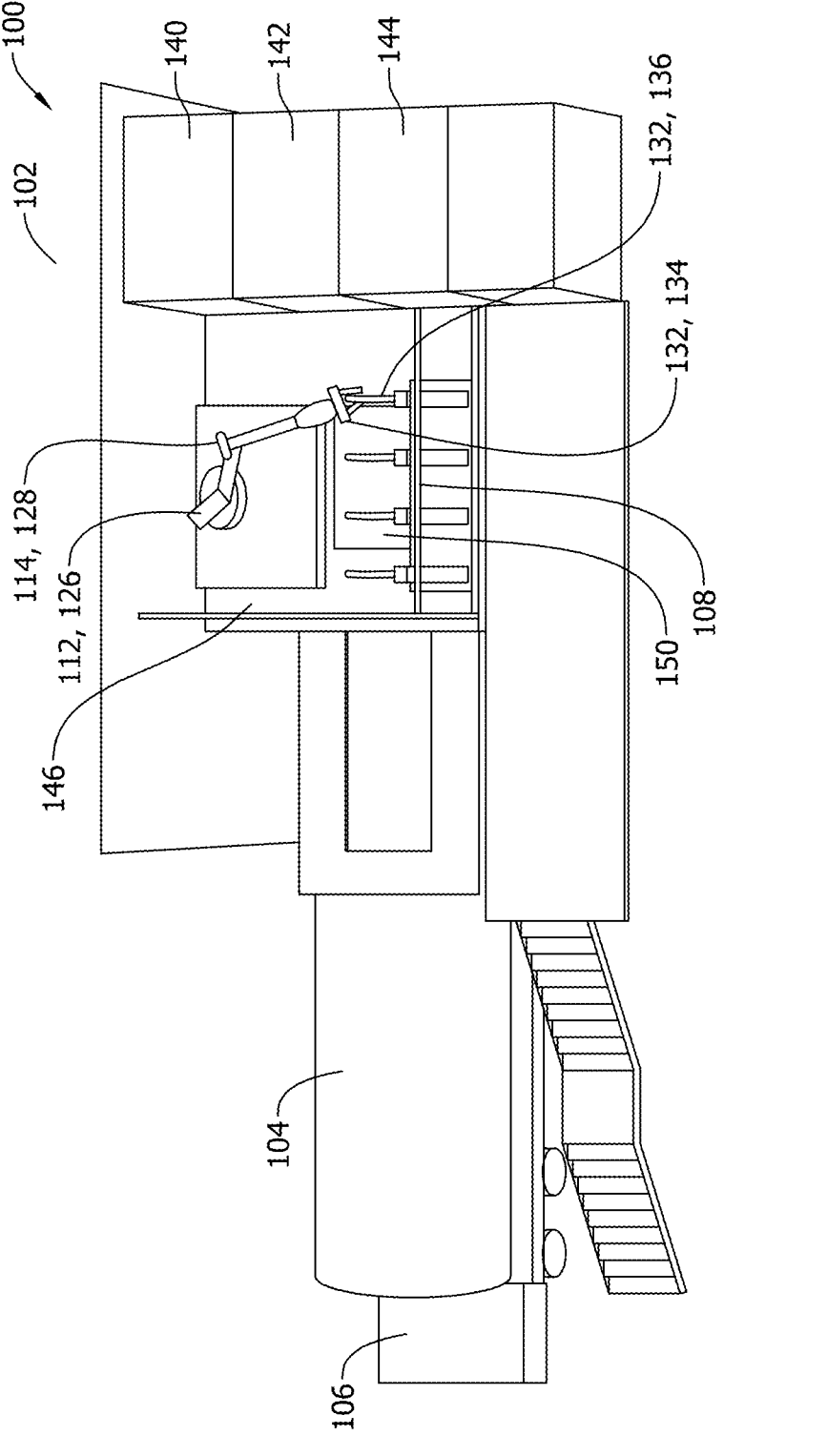
FIG. 5 shows a further perspective view of the logistics system according to the invention.

As may be seen in FIG. 5, the transshipment site 102 furthermore comprises at least one cleaning apparatus 132. The cleaning apparatus 132 is configured to at least externally clean the tank nozzle 118 of the mobile tank 104. By way of example, the cleaning apparatus 132 comprises a spray head 134 for spraying or applying a cleaning agent, and an associated cleaning hose 136. The cleaning hose 136 may in turn be fluidically connected to the pipe system 108. As an alternative, the cleaning hose 136 may be connected to a separate cleaning pipe system. The transshipment site 102 is furthermore configured to control the temperature of the mobile tank 104. The mobile tank 104 may in particular be heated or cooled. To this end, the transshipment site 102 is designed for the detachable connection of a temperature control connection 138 to the mobile tank 104. More precisely, the movement system 112 is designed for the detachable connection of the temperature control connection 138 to the mobile tank 104. By way of example, the movement system 112 optionally has a further movement arm 114' that is designed to move the temperature control connection 138. As an alternative, depending on the application, the movement arm 114 may be designed to move the temperature control connection 138. The transshipment site 102 furthermore comprises at least one monitoring apparatus 140. The monitoring apparatus 140 is configured to monitor a loading state of the mobile tank 104. By way of example, the monitoring apparatus comprises a fill level sensor, pressure sensor and/or a weight sensor or the like.

The logistics system 100 furthermore comprises at least one controller 142. The controller 142 is programmed to control at least one function of the logistics system 100. The controller 142 is in particular configured to clear or to block the fluid connection between the tank nozzle 118 and the pipe connection 110. The controller 142 is furthermore configured to detect a demand for transshipment of the fluid medium. The controller 142 is furthermore configured to automatically request at least one mobile tank 104 for the transshipment and to provide it at the transshipment site 102 according to the demand.

The logistics system 100 furthermore comprises at least one analysis apparatus 144 for acquiring at least one parameter of the fluid medium. The parameter is selected from the group consisting of: a chemical property of the fluid medium; a purity of the fluid medium; a physical property of the fluid medium; a type of the fluid medium; a filling quantity of the fluid medium inside the mobile tank 104. The controller 142 is configured to compare the at least one parameter with at least one specification and to clear or to block the fluid connection between the tank nozzle 118 and the pipe connection 110 according to the result of the comparison.

In the embodiment shown, the transshipment site 102 furthermore optionally has at least one accessible platform 146. The accessible platform 146 has a floor 148 with an opening 150 and a door 152. The floor 148 is arranged at a height that exceeds a height of the mobile tank 104. The floor 148 of the accessible platform 146 is thereby arranged above the mobile tank 104 during loading and/or unloading of the mobile tank 104. The door 152 may in particular be a flap and/or a sliding door 154. In the embodiment shown, the door 152 is a sliding door 154. The door 152 is designed to selectively close and release the opening 150. The controller 142 is configured to release the opening 150 by moving the door 152 when the mobile tank 104 is located at a predetermined position below the floor 148. The logistics system 100 may furthermore optionally have at least one warehouse, not shown in more detail, for multiple mobile tanks 104.

A method according to the invention for the transshipment of at least one fluid medium is described below. The logistics system 100 according to the invention is used in the method. In particular, the method is computer-controlled by the controller 142.

First of all, at least one mobile tank 104 is brought to the transshipment site 102, as illustrated in FIG. 1. The opening 150 of the accessible platform 146 is blocked by way of the door 152. The mobile tank 104 is brought to the transshipment site 102 on a driverless industrial truck 106, or is provided thereon. In particular, a demand for transshipment of the fluid medium is detected. If for example monitoring of production reveals that there is a demand for a predetermined fluid medium, this triggers a demand message in the controller 142. A mobile tank 104 is then requested automatically according to the demand and provided at the transshipment site 102 for the transshipment. The request may optionally also be triggered manually. The demand may also indicate that production has reached a predetermined quantity of the fluid medium and that it is thus ready for delivery. To this end, it must be conveyed into a mobile tank 104.

If the mobile tank 104 is provided at the transshipment site 102, as illustrated in FIG. 2, the opening 150 of the accessible platform 146 is released by moving the door 152, as illustrated in FIG. 3, when the mobile tank 104 is located at a predetermined position below the floor 148. Otherwise, the opening 150 remains closed by the door 152. This serves to protect against falls.

Figure 6:
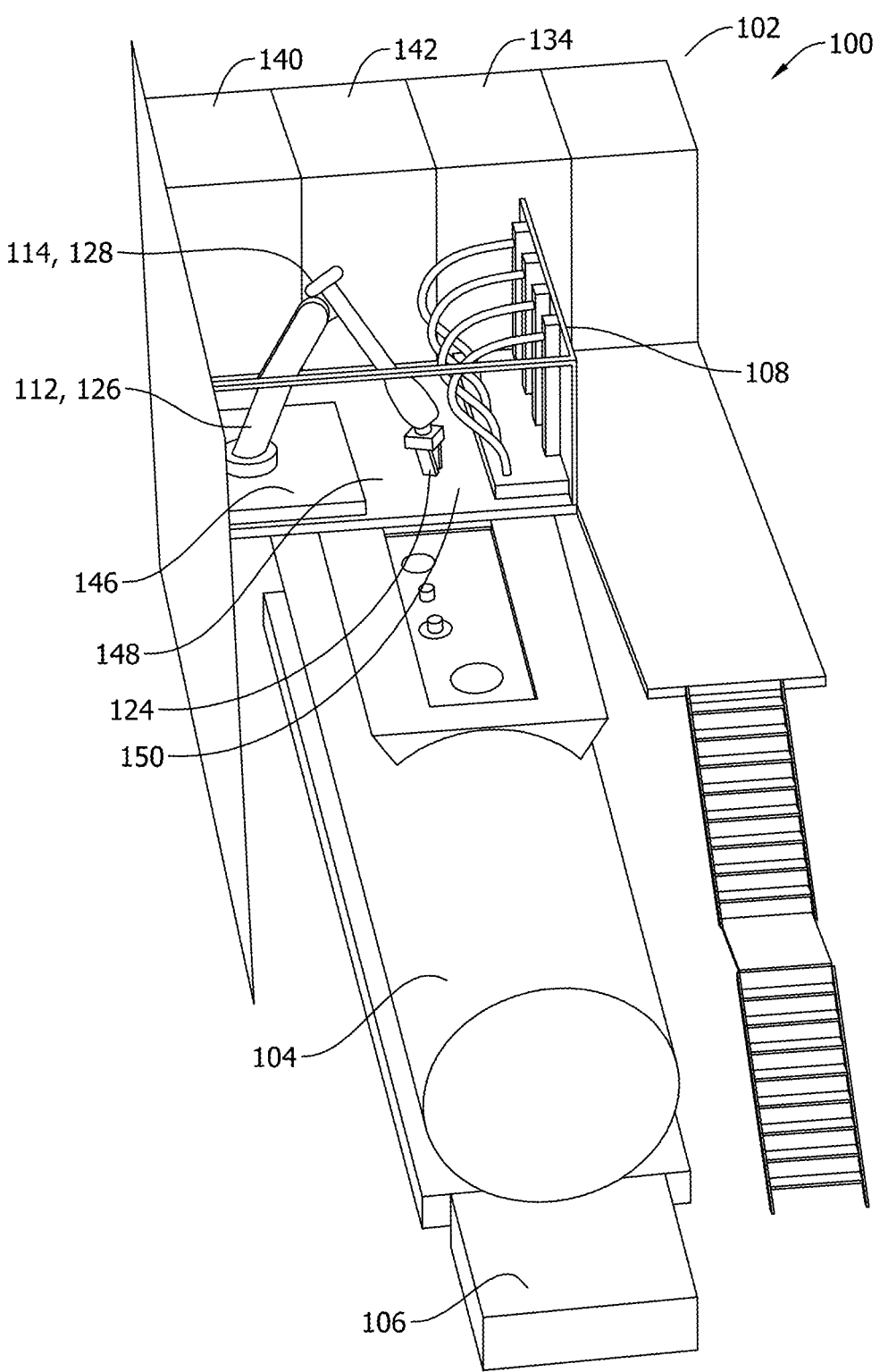
FIG. 6 shows a further perspective view of the logistics system according to the invention.
Figure 7:
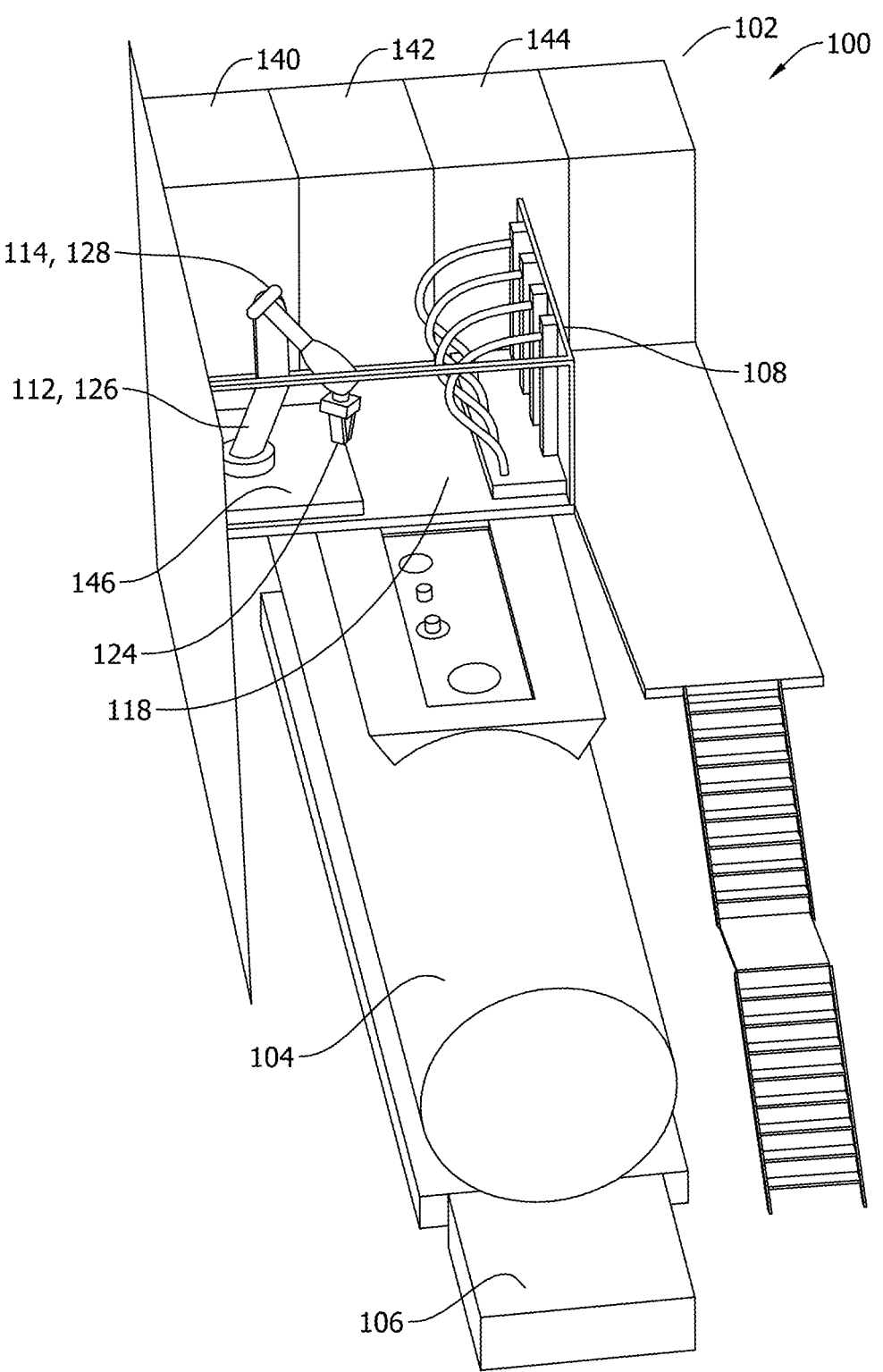
FIG. 7 shows a further perspective view of the logistics system according to the invention.

The tank sensor 130 then detects a position and/or type of the tank nozzle 118 of the mobile tank 104, as illustrated in FIG. 4. To this end, the tank sensor 130 is gripped or taken by the movement arm 114 and moved along a region of the mobile tank 104 in which the tank nozzle 118 is located, such as for example along a region of a top of the mobile tank 104. The cleaning apparatus 132 cleans the tank nozzle 118 of the mobile tank 104 at least externally, as illustrated in FIG. 5. The movement arm 114 then removes a cover 124 from the tank nozzle 118 of the mobile tank 104, as illustrated in FIG. 6. As an alternative or in addition, the tank nozzle 118 may be cleaned after the cover 124 has been removed. As illustrated in FIG. 7, the movement arm 114 may place the cover 124 for example in the region of the platform 146.

Figure 8:
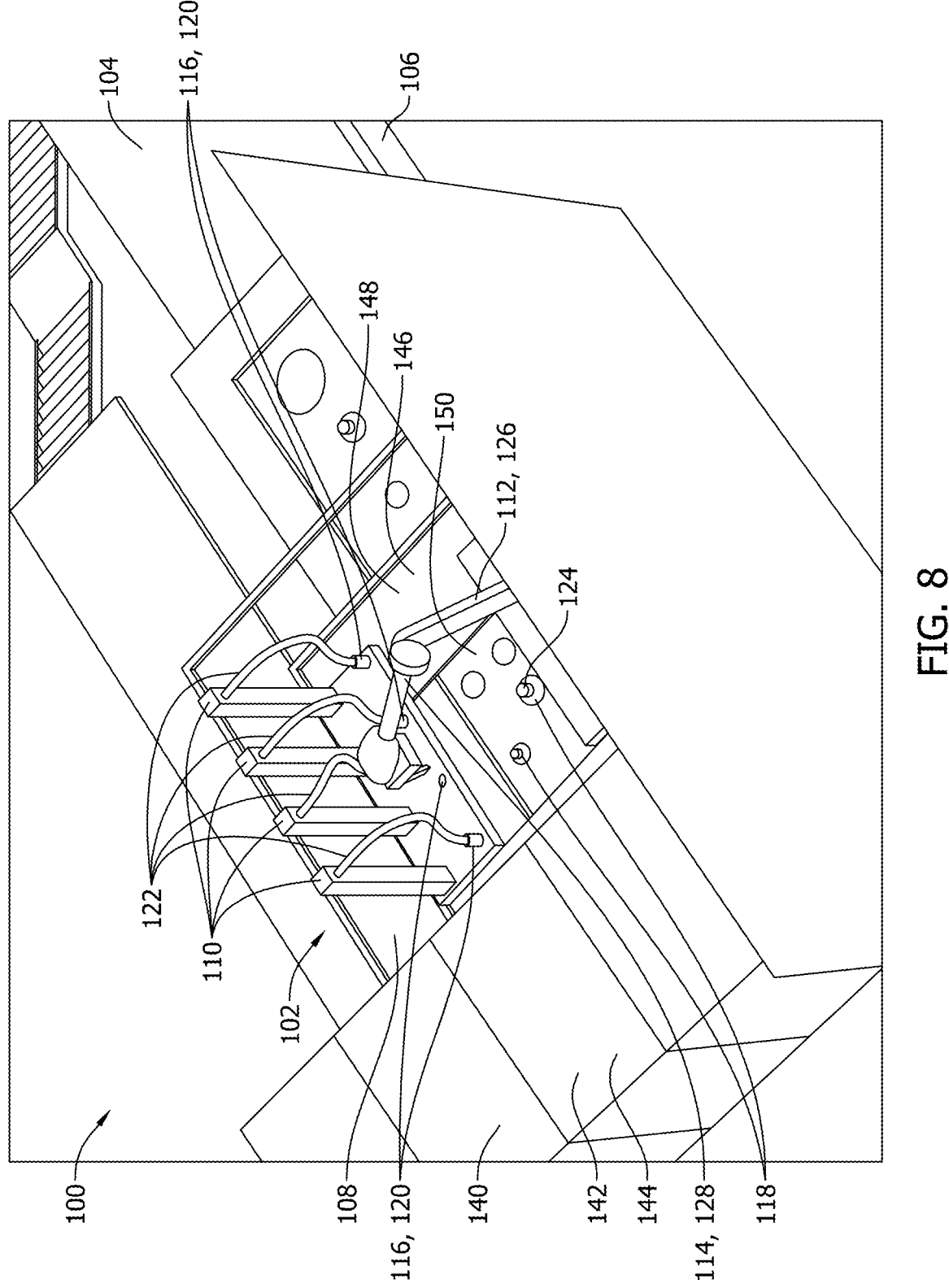
FIG. 8 shows a further perspective view of the logistics system according to the invention.
Figure 9:
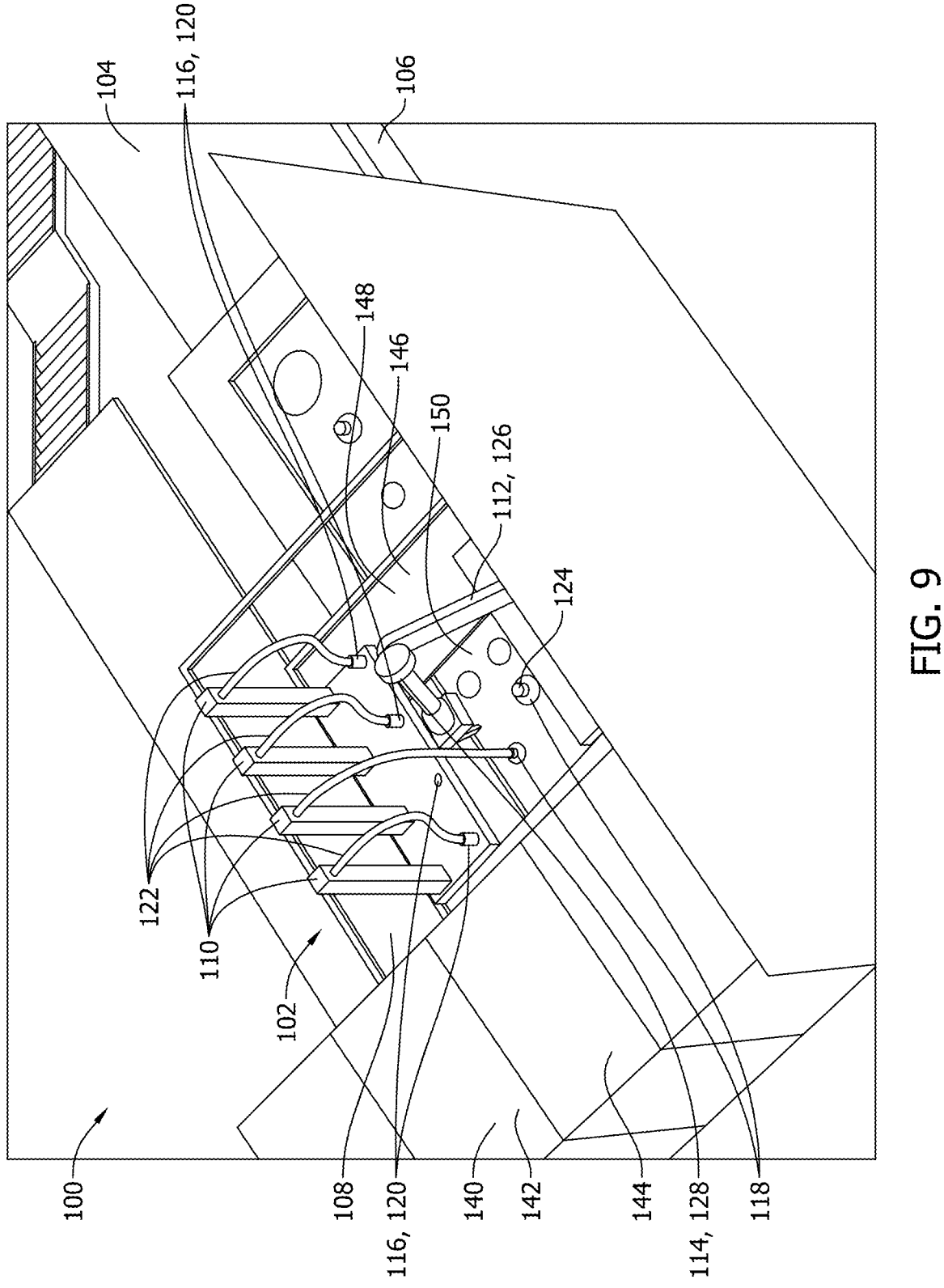
FIG. 9 shows a further perspective view of the logistics system according to the invention.
Figure 10:
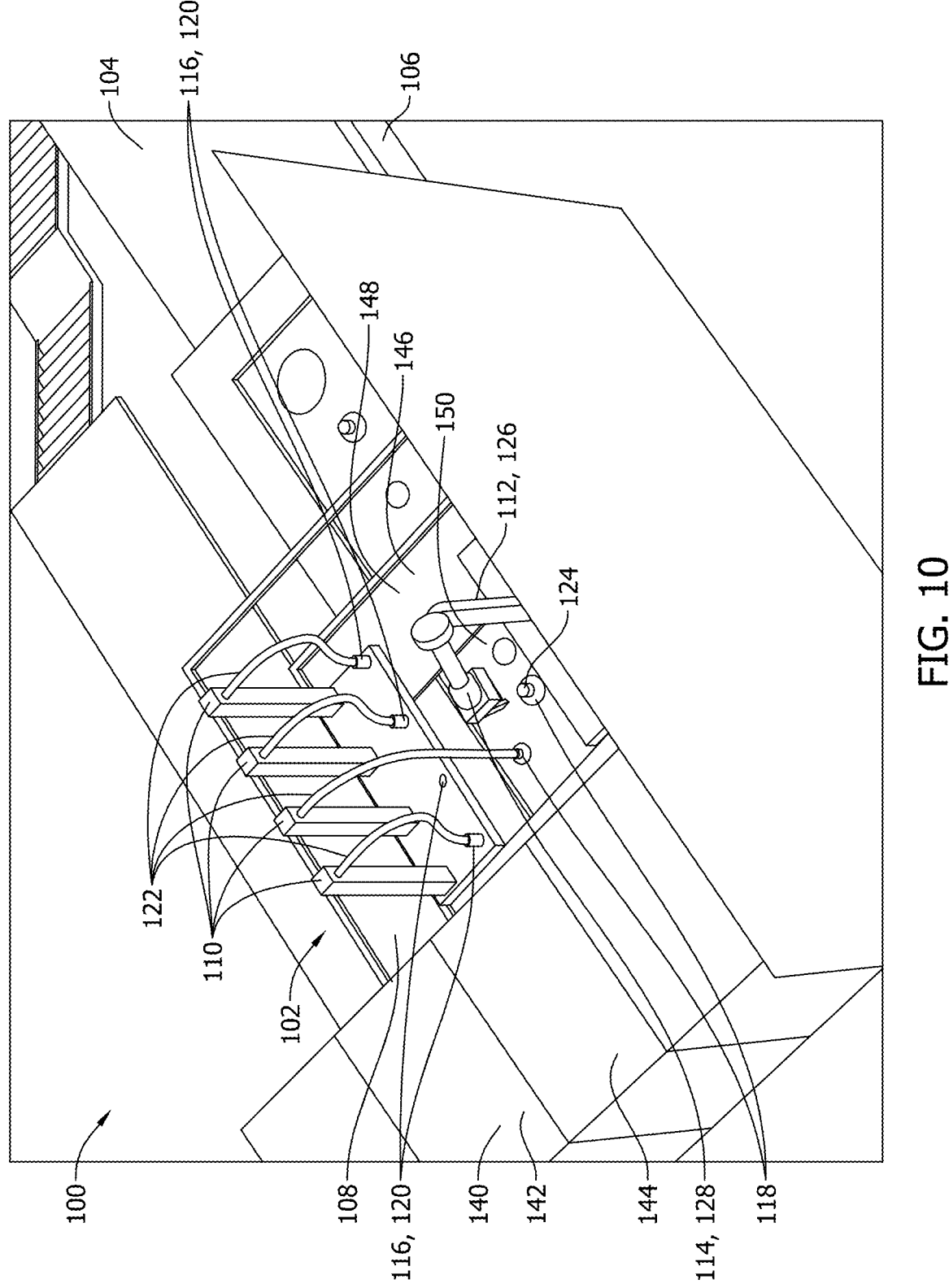
FIG. 10 shows a further perspective view of the logistics system according to the invention.
Figure 11:
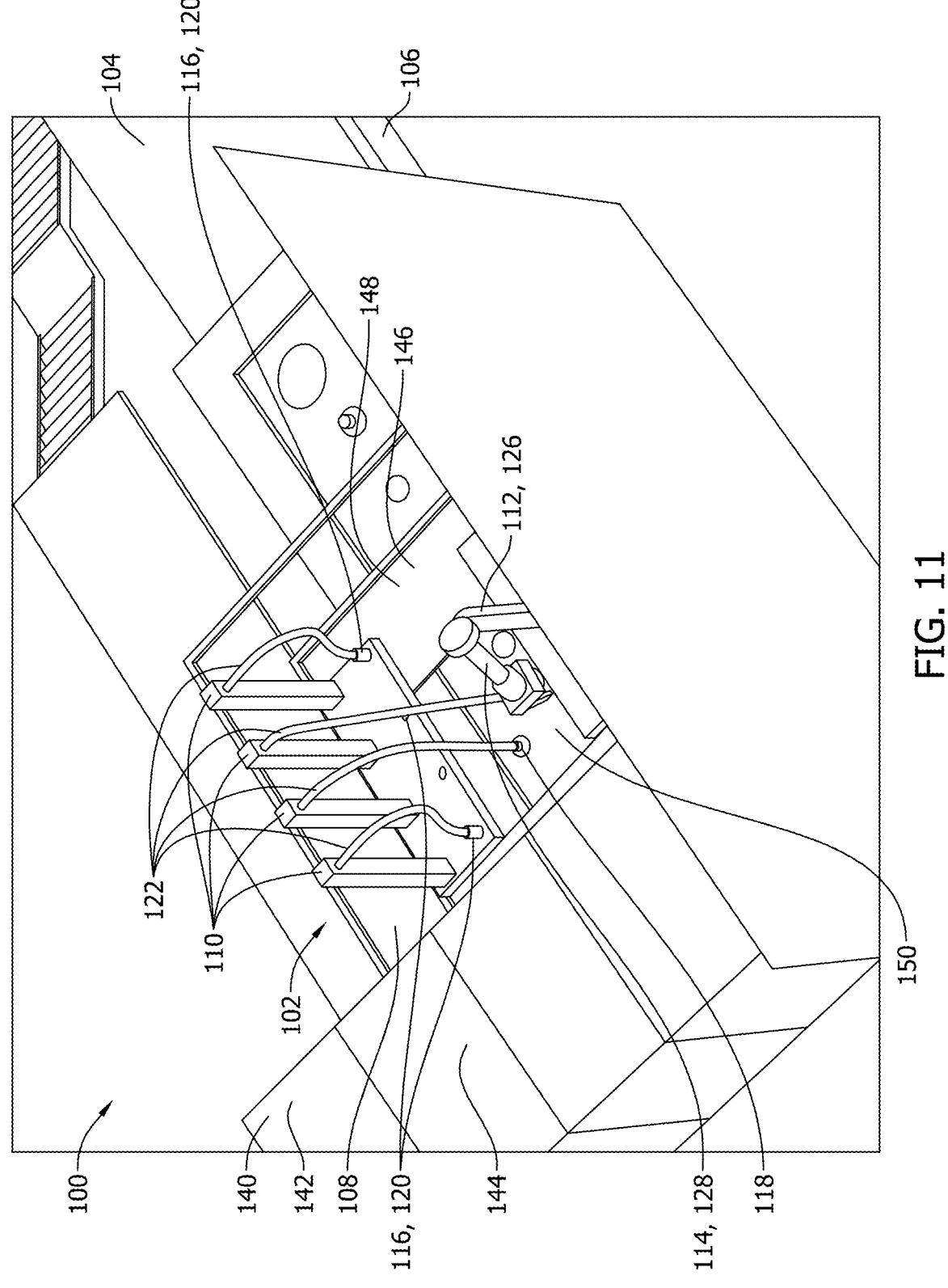
FIG. 11 shows a further perspective view of the logistics system according to the invention.

The movement arm 114 then grips the hose 122 of the pipe connection 110, as illustrated in FIG. 8, and moves it to the tank nozzle 118 of the mobile tank 104, as illustrated in FIG. 9. As illustrated in FIGS. 10 and 11, the movement arm 114 may connect more than one hose 122 to more than one tank nozzle 118 of the mobile tank 104. The hose 122 is connected to the coupling system 116, or is connected thereto beforehand. Through placement of the coupling piece 120 of the coupling system 116, the tank nozzle 118 of the mobile tank 104 is opened automatically. The pipe connection 110 is additionally opened automatically by way of the coupling system 116. At least one fluid connection between the tank nozzle 118 and the pipe connection 110 is thereby established by way of the automatic coupling system 116. The controller 142 may clear or block the fluid connection between the tank nozzle 118 and the pipe connection 110. At least one parameter of the fluid medium is thus acquired by way of the analysis apparatus 144. The at least one parameter is compared with at least one specification. The fluid connection between the tank nozzle 118 and the pipe connection 110 is then cleared or blocked according to the result of the comparison. The controller 142 thus opens a valve of the pipe connection 110, provided that the parameter corresponds to a specification, and closes it if the parameter deviates from the specification. By way of example, if the fluid medium and its properties corresponds to a requested fluid medium and its properties, the fluid connection is cleared; otherwise, it is blocked.

In the event of the fluid connection being cleared, the mobile tank 104 is loaded or unloaded. Circulation of the fluid medium in the circuit is optionally also possible. The loading state of the mobile tank 104 is monitored in this case.

Figure 12:
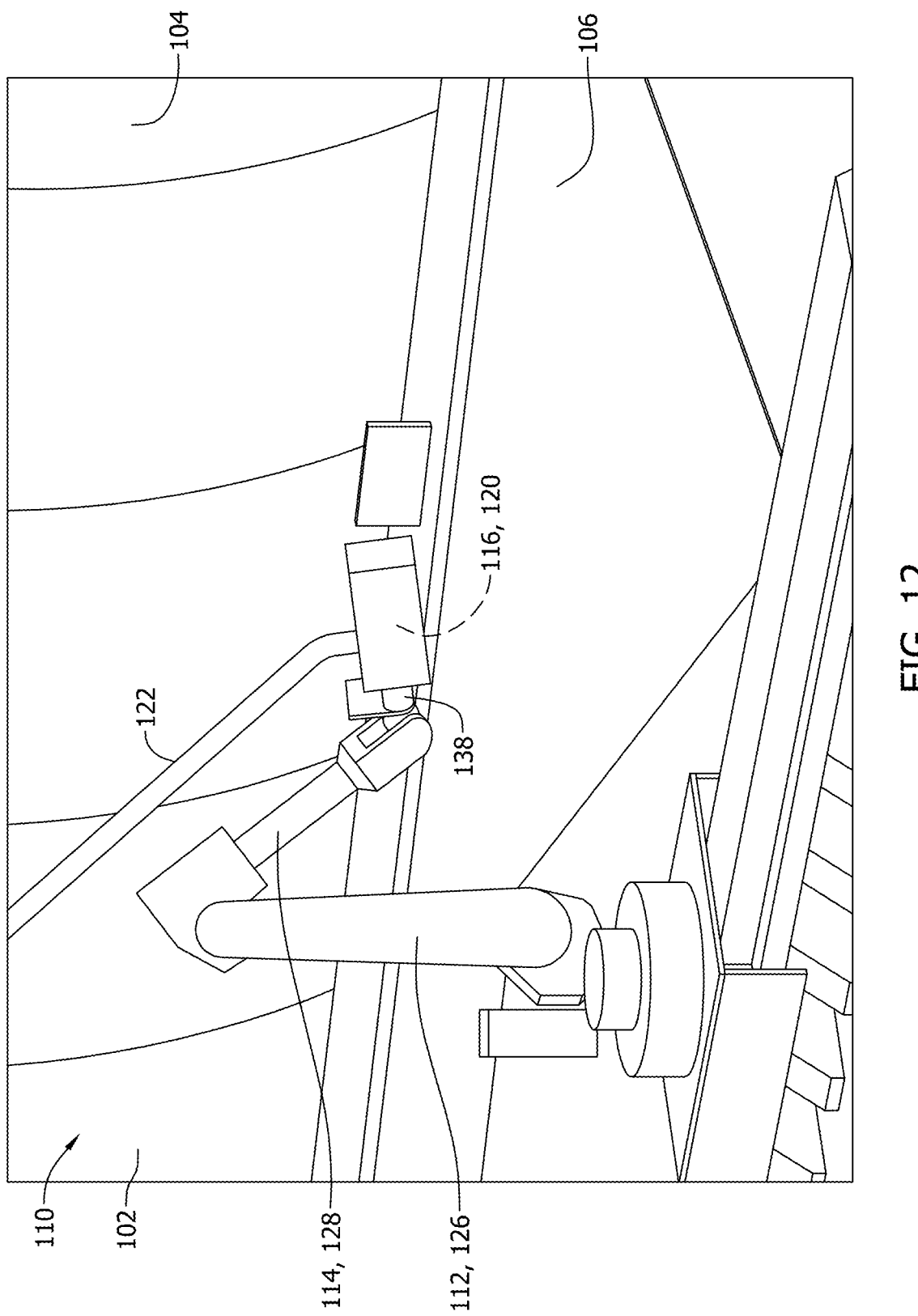
FIG. 12 shows a further perspective view of the logistics system according to the invention.

The mobile tank 104 or the fluid medium therein optionally have their temperature controlled, for example are heated or cooled. To this end, the temperature control connection 138 may be connected detachably to the mobile tank 104, as illustrated in FIG. 12. The temperature control connection 138 is connected detachably to the mobile tank 104 by way of the further movement arm 114'. The temperature control is carried out in this case in particular during loading and/or unloading of the fluid medium. The temperature control connection 138 is then removed again from the mobile tank 104 by way of the robot arm 128.

Optionally, a tank number of the mobile tank 104 may be recorded by way of a sensor or an OCR system. The recorded tank number is compared with a tank number stored in a database, such as for example an order to provide the mobile tank 104. The tank number thus recorded is verified for correctness. The tank number may be verified for correctness using a check digit. The mobile tank is released for loading and/or unloading only if the verification of the tank number of the mobile tank is correct. Otherwise, release does not take place.

Optionally, an identifier of the mobile tank may furthermore be recognized using a sensor or an OCR system and labels or warning signs may be attached or old labels or warning signs may be removed or concealed by way of a machine for labeling mobile tanks, such as for example a labeling machine, in accordance with the specifications in a computer program. The identifier may in particular be a hazardous goods identifier. The system is thereby also capable of attaching the proper and correct hazardous goods identifier to the mobile tank after loading and/or unloading.

Figure 13:
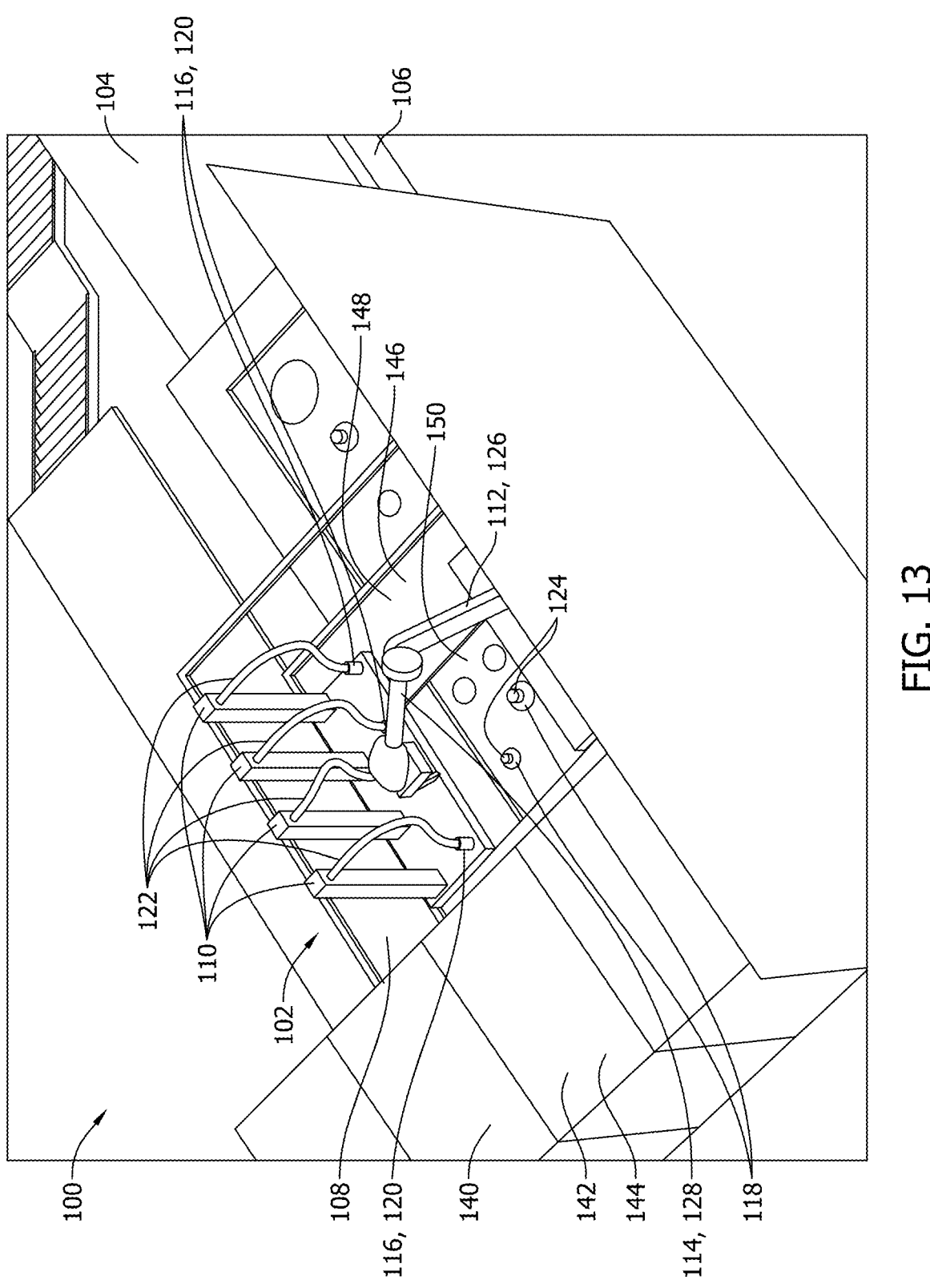
FIG. 13 shows a further perspective view of the logistics system according to the invention.
Figure 14:
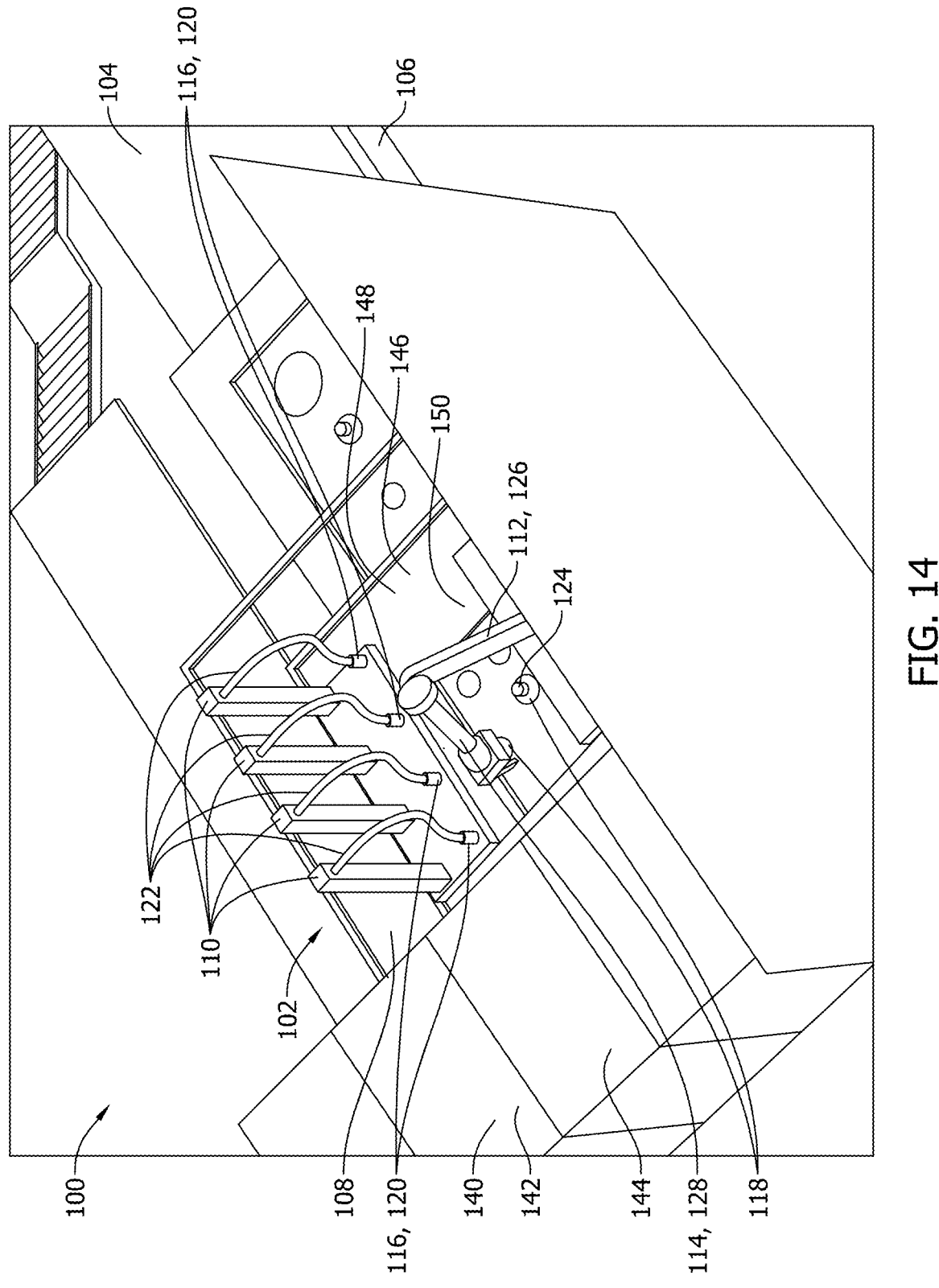
FIG. 14 shows a further perspective view of the logistics system according to the invention.
Figure 15:
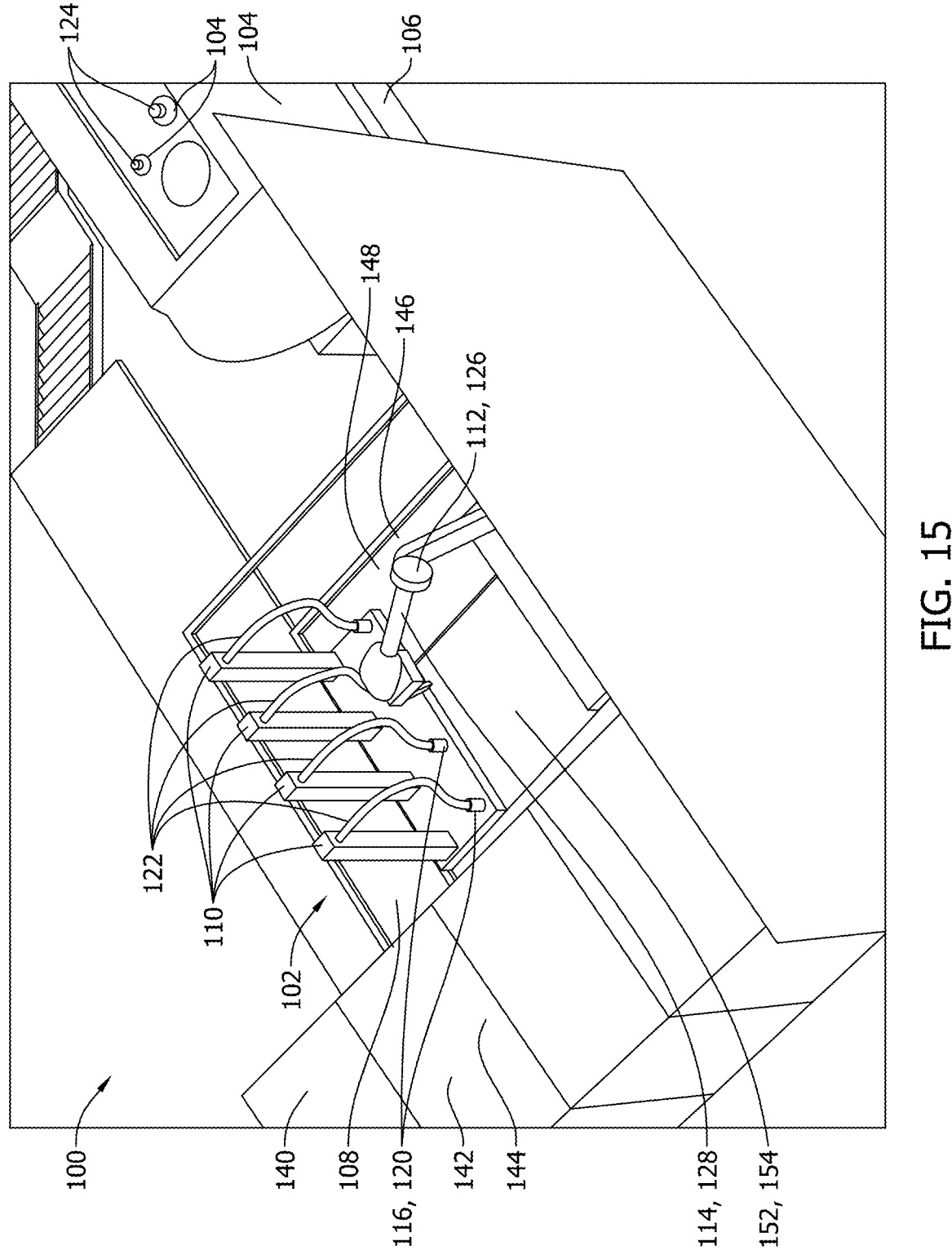
FIG. 15 shows a further perspective view of the logistics system according to the invention.
Figure 16:
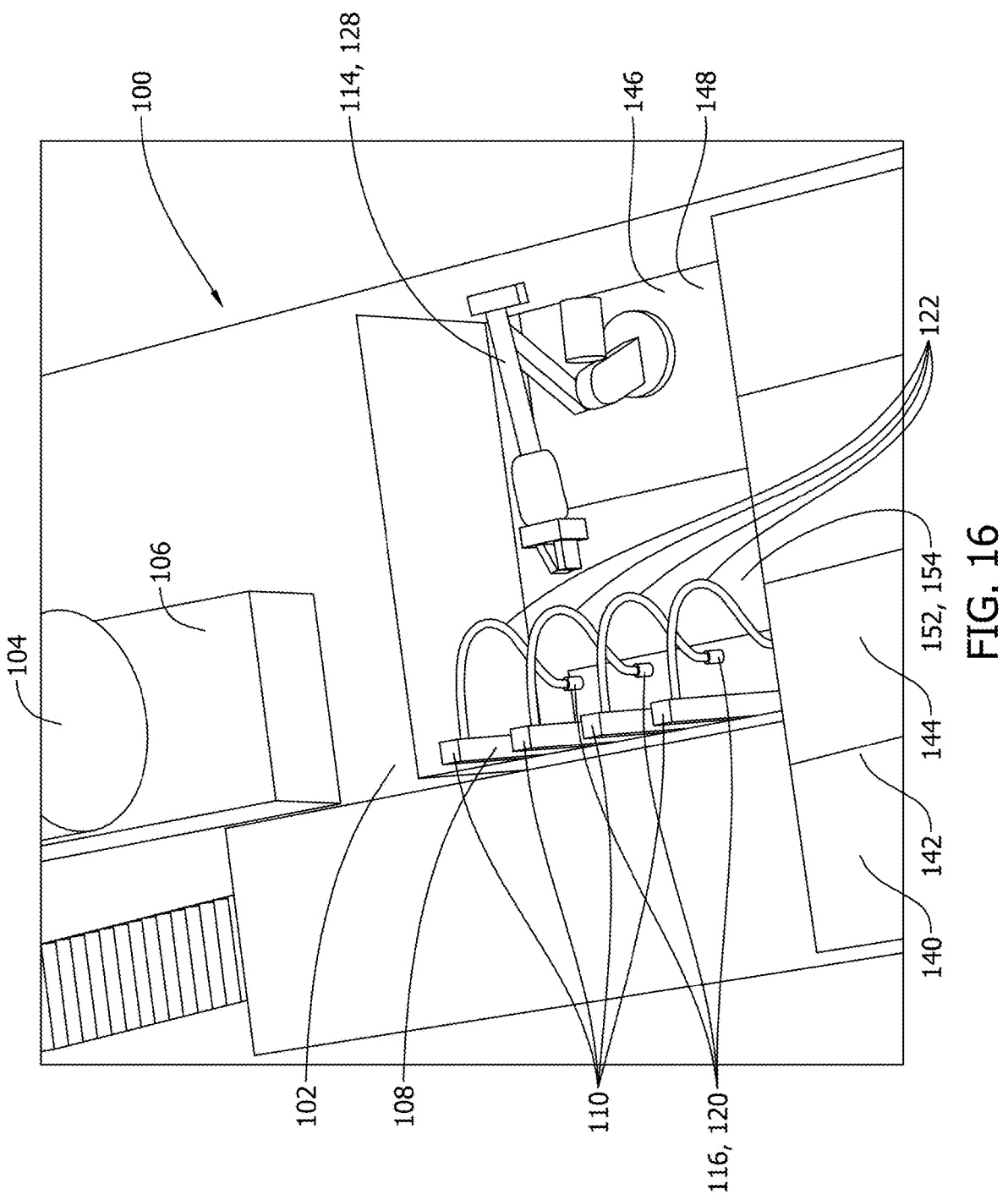
FIG. 16 shows a further perspective view of the logistics system according to the invention.

After the loading or unloading process, the pipe connection 110 and the coupling system 116 is removed again from the tank nozzle 118 by way of the robot arm 128, as illustrated in FIG. 13. The tank nozzle 118 is closed again with the cover 124, as illustrated in FIG. 14. After loading and/or unloading the mobile tank 104, the opening 150 of the platform 146 is closed by way of the door 152. This serves to protect against falls. The mobile tank 104 may additionally be removed from the transshipment site 102. By way of example, the mobile tank 104 is transported away from the transshipment site 102 by way of a driverless industrial truck 106, as illustrated in FIGS. 15 and 16.

LIST OF REFERENCE NUMERALS

100 Logistics system
102 Transshipment site
104 Mobile tank
106 Driverless industrial truck
108 Pipe system
110 Pipe connection
112 Movement system
114 Movement arm
114' Further movement arm
116 Coupling system
118 Tank nozzle
120 Coupling piece
122 Hose
124 Cover
126 Robot system
128 Robot arm
130 Tank sensor
132 Cleaning apparatus
134 Spray head
136 Cleaning hose
138 Temperature control connection
140 Monitoring apparatus
142 Controller

144 Analysis apparatus
146 Platform
148 Ground
150 Opening
152 Door
154 Sliding door

The invention claimed is:

1. A logistics system for the automatic transshipment of at least one fluid medium, comprising a. at least one transshipment site, wherein the transshipment site is configured to carry out at least one process selected from the group consisting of loading a mobile tank with the fluid medium and unloading the fluid medium from the mobile tank, wherein the transshipment site has at least one pipe system having at least one pipe connection; and b. at least one controller, wherein the controller is programmed to control at least one function of the logistics system; and c. at least one movement system having at least one movement arm and an automatic coupling system, wherein the movement arm is configured to move the coupling system, wherein the automatic coupling system is configured to automatically open at least one tank nozzle of the mobile tank, wherein the automatic coupling system is further configured to automatically open the pipe connection of the transshipment site, and wherein the automatic coupling system is further configured to fluidically connect the tank nozzle and the pipe connection.

2. The logistics system according to claim 1, wherein the controller is configured to clear or to block the fluid connection between the tank nozzle and the pipe connection.

3. The logistics system according to claim 1, wherein the controller is configured to detect a demand for transshipment of the fluid medium, wherein the controller is further configured to automatically request at least one mobile tank for the transshipment and to provide it at the transshipment site according to the demand.

4. The logistics system according to claim 1, wherein the transshipment site further comprises at least one tank sensor, wherein the tank sensor is configured to detect a position and/or type of the tank nozzle of the mobile tank.

5. The logistics system according to claim 1, wherein the transshipment site further comprises at least one cleaning apparatus, wherein the cleaning apparatus is configured to at least externally clean the tank nozzle of the mobile tank.

6. The logistics system according to claim 1, wherein the transshipment site further comprises at least one monitoring apparatus, wherein the monitoring apparatus is configured to monitor a loading state of the mobile tank.

7. The logistics system according to claim 1, wherein the automatic coupling system has at least one coupling piece, wherein the automatic coupling piece is configured to automatically open the at least one tank nozzle of the mobile tank through placement of the coupling piece.

8. The logistics system according to claim 1, wherein the movement system is a robot system, wherein the movement arm is a robot arm.

9. A method for the transshipment of at least one fluid medium using at least one logistics system according to claim 1, wherein the method comprises:

i. bringing the at least one mobile tank to the transshipment site;

ii. automatically opening the at least one pipe connection of the transshipment site by way of the automatic coupling system;

iii. automatically opening the at least one tank nozzle of the mobile tank by way of the automatic coupling system;

iv. establishing at least one fluid connection between the tank nozzle and the pipe connection by way of the automatic coupling system; and v. carrying out at least one process selected from the group consisting of: loading the mobile tank with the fluid medium from the pipe system of the transshipment site; and unloading the fluid medium from the mobile tank into the pipe system of the transshipment site.

10. The logistics system according to claim 1, wherein the transshipment site is further configured to heat or to cool the mobile tank.

11. The logistics system according to claim 1, further comprising at least one analysis apparatus for acquiring at least one parameter of the fluid medium.

12. The logistics system according to claim 11, wherein the controller is configured to compare the at least one parameter with at least one specification and to clear or to block the fluid connection between the tank nozzle and the pipe connection according to the result of the comparison.

13. The logistics system according to claim 1, wherein the pipe connection comprises at least one hose, wherein the hose is connected, or able to be connected, to the coupling system, wherein the movement arm is designed to grip and to move the hose.

14. The logistics system according to claim 3, wherein the movement arm is designed to remove and/or attach a cover from and/or on the tank nozzle of the mobile tank.

15. The logistics system according to claim 1, wherein the transshipment site is further configured to control the temperature of the mobile tank.

16. The logistics system according to claim 15, wherein the transshipment site is designed for the detachable connection of a temperature control connection to the mobile tank.

17. The logistics system according to claim 16, wherein the movement system is designed for the detachable connection of the temperature control connection to the mobile tank.

* * * * *